United States Patent
Chu et al.

(10) Patent No.: US 11,112,542 B2
(45) Date of Patent: Sep. 7, 2021

(54) MINIATURE OPTICAL LENS ASSEMBLY HAVING OPTICAL ELEMENT, IMAGING APPARATUS AND ELECTRONIC DEVICE

(71) Applicant: LARGAN PRECISION CO., LTD., Taichung (TW)

(72) Inventors: Kuo-Chiang Chu, Taichung (TW); Chien-Pang Chang, Taichung (TW); Chun-Hung Teng, Taichung (TW); Wen-Yu Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 81 days.

(21) Appl. No.: 16/699,224

(22) Filed: Nov. 29, 2019

(65) Prior Publication Data
US 2020/0174167 A1 Jun. 4, 2020

Related U.S. Application Data

(60) Provisional application No. 62/773,250, filed on Nov. 30, 2018.

(51) Int. Cl.
*G02B 1/11* (2015.01)
*G02B 5/00* (2006.01)
*G02B 13/00* (2006.01)

(52) U.S. Cl.
CPC ............ *G02B 5/003* (2013.01); *G02B 13/001* (2013.01)

(58) Field of Classification Search
CPC ...... G02B 5/003; G02B 13/001; G02B 1/118; G02B 1/11; G02B 1/113; G02B 13/00; G02B 5/00
See application file for complete search history.

(56) References Cited

U.S. PATENT DOCUMENTS

| 8,278,386 | B2 | 10/2012 | Nagata et al. |
| 9,625,618 | B2 | 4/2017 | Yamamoto et al. |
| 2005/0233083 | A1 | 10/2005 | Schulz et al. |
| 2009/0261063 | A1 | 10/2009 | Munzert et al. |
| 2011/0051246 | A1 | 3/2011 | Schulz et al. |
| 2011/0281068 | A1 | 11/2011 | David et al. |
| 2012/0176681 | A1* | 7/2012 | Chang ............ C23C 18/1216 359/614 |
| 2012/0316265 | A1* | 12/2012 | Kubota ............ G02B 1/111 523/456 |
| 2013/0057957 | A1* | 3/2013 | Lin ............ G02B 1/115 359/601 |
| 2013/0335625 | A1* | 12/2013 | Pei ............ G02B 1/11 348/374 |

(Continued)

FOREIGN PATENT DOCUMENTS

| TW | 201022373 A | 6/2010 |
| TW | 201331610 A | 8/2013 |

*Primary Examiner* — Balram T Parbadia
(74) *Attorney, Agent, or Firm* — McClure, Qualey & Rodack, LLP

(57) ABSTRACT

A miniature optical lens assembly, which has at least one of optical element, includes the optical element. The optical element includes a low reflection layer disposed on at least one surface of the optical element. The low reflection layer includes a plurality of nanocrystalline grains, and the nanocrystalline grains are located on one surface of the low reflection layer. The optical element is at least one of a light blocking element, an annular spacer element and a barrel element.

19 Claims, 34 Drawing Sheets

(56) References Cited

U.S. PATENT DOCUMENTS

| | | | |
|---|---|---|---|
| 2015/0177419 A1* | 6/2015 | Chu | G02B 1/11 |
| | | | 359/586 |
| 2016/0011415 A1* | 1/2016 | Takada | G02B 1/111 |
| | | | 348/148 |
| 2017/0315269 A1 | 11/2017 | Ogane | |
| 2018/0138351 A1* | 5/2018 | Hsu | H01L 33/44 |
| 2018/0341046 A1* | 11/2018 | Ochi | G02B 5/003 |

* cited by examiner

MINIATURE OPTICAL LENS ASSEMBLY HAVING OPTICAL ELEMENT, IMAGING APPARATUS AND ELECTRONIC DEVICE

RELATED APPLICATIONS

This application claims priority to U.S. Provisional Application Ser. No. 62/773,250, filed Nov. 30, 2018, which is herein incorporated by reference.

BACKGROUND

Technical Field

The present disclosure relates to an optical lens assembly. More particularly, the present disclosure relates to a miniature optical lens assembly having optical elements.

Description of Related Art

In recent years, it has become more and more popular to use a miniature optical lens assembly with optical elements for photographing. However, the use of the mobile device is often affected by strong sunlight in the outdoor environment, so that the image quality of the optical lens assembly will be greatly reduced by strong non-imaging stray light.

In the prior arts, a surface of the opaque optical elements of the optical lens assembly is treated by ink-painting method, sandblasting method and coating method so as to reduce the reflectance thereof and eliminate stray light. However, although the aforementioned methods can increase the image quality of the optical lens assembly, it is still not effective enough to eliminate high-intensity stray light. Furthermore, in the field of the optical lens assembly of the non-mobile devices, there are other techniques for reducing reflectance, for example, by creating a film-layer surface thereon so as to create a porous microstructure. However, the structural support of the porous microstructure is insufficient, and the film-layer surface is easy to deform when an external force is applied thereon so that the anti-reflection effect will be greatly reduced.

Moreover, although most of the prior arts can achieve a better anti-reflection effect by a multi-layer coating method, the multi-layer preparing process is complicated, and the cost of the coating is high, making it impossible to be widely used in the optical lens industry.

SUMMARY

According to one aspect of the present disclosure, a miniature optical lens assembly, which has at least one of optical element, includes the optical element. The optical element includes a low reflection layer. The low reflection layer is disposed on at least one surface of the optical element, wherein the low reflection layer includes a plurality of nanocrystalline grains located on one surface of the low reflection layer. The optical element is at least one of a light blocking element, an annular spacer element and a barrel element. When an average diameter of the nanocrystalline grains is DC, and a reflectance in a wavelength range of 380 nm-780 nm of the low reflection layer is R3878, the following conditions are satisfied:

5 nm≤DC≤200 nm; and $R3878 \leq 0.50\%$.

According to another aspect of the present disclosure, an imaging apparatus includes the miniature optical lens assembly according to the aforementioned aspect and an image sensor disposed on an image surface of the optical image lens assembly with the optical element.

According to another aspect of the present disclosure, an electronic device includes the imaging apparatus according to the aforementioned aspect.

BRIEF DESCRIPTION OF THE DRAWINGS

The present disclosure can be more fully understood by reading the following detailed description of the embodiment, with reference made to the accompanying drawings as follows:

FIG. 1-1 shows a surface diagram of crystalline grains according to the 1st embodiment of the present disclosure.

FIG. 1-2 shows a surface diagram of crystalline grains according to the 2nd embodiment of the present disclosure.

FIG. 1-3 shows a surface diagram of crystalline grains according to the 3rd embodiment of the present disclosure.

FIG. 1-4 shows a surface diagram of crystalline grains according to the 4th embodiment of the present disclosure.

FIG. 1-5 shows a surface diagram of crystalline grains according to the 5th embodiment of the present disclosure.

FIG. 1-6 shows a surface diagram of crystalline grains according to the 6th embodiment of the present disclosure.

FIG. 1-7 shows a surface diagram of crystalline grains according to the 7th embodiment of the present disclosure.

FIG. 1-8 shows a surface diagram of crystalline grains according to the 8th embodiment of the present disclosure.

FIG. 1-9 shows a surface diagram of crystalline grains according to the 9th embodiment of the present disclosure.

FIG. 1-10 shows a surface diagram of crystalline grains according to the 10th embodiment of the present disclosure.

FIG. 2 shows the values of reflectance in a wavelength range of 380 nm-780 nm of a low reflection layer according to the 11th embodiment to the 20th embodiment of the present disclosure.

FIG. 2-1 shows a surface diagram of crystalline grains according to the 11th embodiment of the present disclosure.

FIG. 2-2 shows a surface diagram of crystalline grains according to the 12th embodiment of the present disclosure.

FIG. 2-3 shows a surface diagram of crystalline grains according to the 13th embodiment of the present disclosure.

FIG. 2-4 shows a surface diagram of crystalline grains according to the 14th embodiment of the present disclosure.

FIG. 2-5 shows a surface diagram of crystalline grains according to the 15th embodiment of the present disclosure.

FIG. 2-6 shows a surface diagram of crystalline grains according to the 16th embodiment of the present disclosure.

FIG. 2-7 shows a surface diagram of crystalline grains according to the 17th embodiment of the present disclosure.

FIG. 2-8 shows a surface diagram of crystalline grains according to the 18th embodiment of the present disclosure.

FIG. 2-9 shows a surface diagram of crystalline grains according to the 19th embodiment of the present disclosure.

FIG. 2-10 shows a surface diagram of crystalline grains according to the 20th embodiment of the present disclosure.

FIG. 3 shows the values of reflectance in a wavelength range of 380 nm-780 nm of a low reflection layer according to the 21st embodiment to the 30th embodiment of the present disclosure.

FIG. 3-1 shows a surface diagram of crystalline grains according to the 21st embodiment of the present disclosure.

FIG. 3-2 shows a surface diagram of crystalline grains according to the 22nd embodiment of the present disclosure.

FIG. 3-3 shows a surface diagram of crystalline grains according to the 23rd embodiment of the present disclosure.

FIG. 3-4 shows a surface diagram of crystalline grains according to the 24th embodiment of the present disclosure.

FIG. 3-5 shows a surface diagram of crystalline grains according to the 25th embodiment of the present disclosure.

FIG. 3-6 shows a surface diagram of crystalline grains according to the 26th embodiment of the present disclosure.

FIG. 3-7 shows a surface diagram of crystalline grains according to the 27th embodiment of the present disclosure.

FIG. 3-8 shows a surface diagram of crystalline grains according to the 28th embodiment of the present disclosure.

FIG. 3-9 shows a surface diagram of crystalline grains according to the 29th embodiment of the present disclosure.

FIG. 3-10 shows a surface diagram of crystalline grains according to the 30th embodiment of the present disclosure.

FIG. 4 is a relationship diagram between the values of R3878 and an average diameter of the nanocrystalline grains according to the 1st embodiment to the 30th embodiment of the present disclosure.

FIG. 5 is a relationship diagram between the values of R3850 and an average diameter of the nanocrystalline grains according to the 1st embodiment to the 30th embodiment of the present disclosure.

FIG. 6 is a relationship diagram between the values of R4070 and an average diameter of the nanocrystalline grains according to the 1st embodiment to the 30th embodiment of the present disclosure.

FIG. 7 is a relationship diagram between the values of R4055 and an average diameter of the nanocrystalline grains according to the 1st embodiment to the 30th embodiment of the present disclosure.

FIG. 8 is a relationship diagram between the values of R4565 and an average diameter of the nanocrystalline grains according to the 1st embodiment to the 30th embodiment of the present disclosure.

FIG. 9 is a relationship diagram between the values of R5058 and an average diameter of the nanocrystalline grains according to the 1st embodiment to the 30th embodiment of the present disclosure.

FIG. 10 is a relationship diagram between the values of R5570 and an average diameter of the nanocrystalline grains according to the 1st embodiment to the 30th embodiment of the present disclosure.

DETAILED DESCRIPTION

Figure 1:
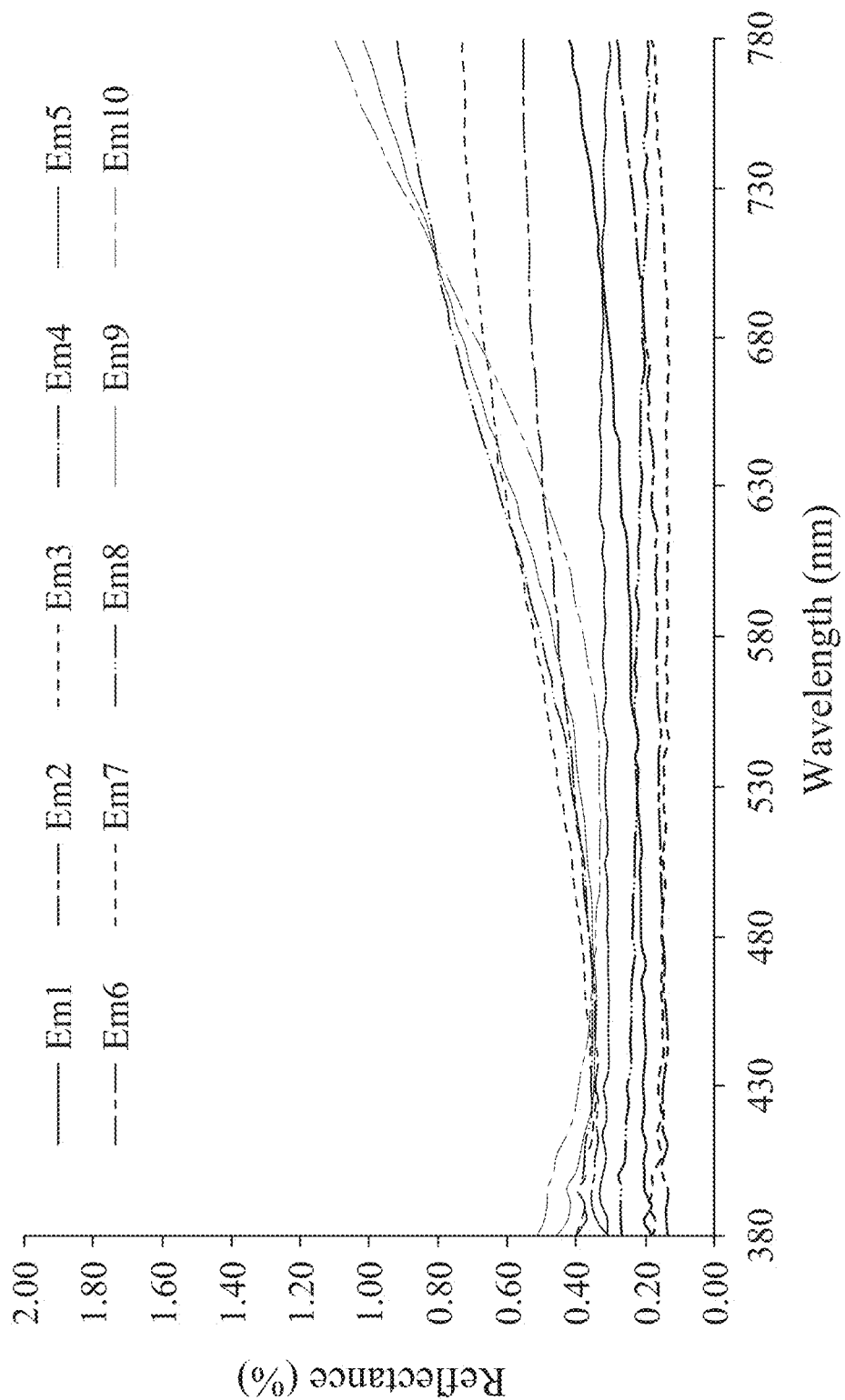
FIG. 1 shows the values of reflectance in a wavelength range of 380 nm-780 nm of a low reflection layer according to the 1st embodiment to the 10th embodiment of the present disclosure.

The present disclosure provides a miniature optical lens assembly, which has at least one of optical element, including the optical element. The optical element includes a low reflection layer disposed on at least one surface of the optical element. The low reflection layer includes a plurality of nanocrystalline grains, and the nanocrystalline grains are located on one surface of the low reflection layer. The optical element is at least one of a light blocking element, an annular spacer element and a barrel element. When an average diameter of the nanocrystalline grains is DC, and a reflectance in a wavelength range of 380 nm-780 nm of the low reflection layer is R3878, the following conditions are satisfied: 5 nm≤DC≤200 nm; and R3878≤0.50%.

In detail, a surface structure having the nanocrystalline grains of the miniature optical lens assembly of the present disclosure can be obtained by a crystallization process. The crystallization process is performed through the arrangement that the low reflection layer is disposed on the at least one surface of the optical element, and the at least one surface of the low reflection layer is roughened and then a nucleation reaction (such as physical vapor deposition, chemical vapor deposition, vacuum evaporation, sputtering, ion plating, etc.) is performed thereon with appropriate materials. Because the surface of the low reflection layer includes the nanocrystalline grains with proper particle sizes, the intensity of stray light being incident thereon can be further destroyed and suppressed. Furthermore, a gradual distribution of the refractive index between the surface of the optical element and the air can be achieved by the nanocrystalline grains made of material with a proper refractive index, so that the light can be incident smoothly but not be reflected. Thus, it is favorable for maintaining an ultra-low reflectance of the surface of the optical element so as to significantly enhance the image quality of the miniature optical lens assembly of the present disclosure. Therefore, the miniature optical lens assembly of the present disclosure is suitable for applying on the surface of the optical element of the lens assembly of mobile devices, so that it is favorable for significantly enhancing the optical image quality and has cost advantages for a wide range of applications.

In the miniature optical lens assembly of the present disclosure, the low reflection layer can be made of dark coating material having a light-absorbing ability. The dark coating material has a property of being easily coated and adhered to the surface of elements, so that it is favorable for mass production, but the present disclosure is not limited thereto.

In the miniature optical lens assembly of the present disclosure, the nanocrystalline grains can be made of oxide material, such as $SiO_2$, $Al_2O_3$, $TiO_2$, $Ta_2O_5$, $TeO_2$, ZnO, $ZrO_2$, $GeO_2$, MgO, etc. Furthermore, the nanocrystalline grains also can be made of metal nitride material, such as AlN, SiN, $Si_3N_4$, etc. Furthermore, the nanocrystalline grains also can be made of metal fluoride material, such as $MgF_2$, $CaF_2$, etc. However, the present disclosure is not limited thereto. Furthermore, when a refractive index at a wavelength of 587.6 nm of the nanocrystalline grains is NC, the following condition can be satisfied: NC≤2.1. Furthermore, the following condition can be satisfied: NC≤1.9. Furthermore, the following condition can be satisfied: NC≤1.8. Furthermore, the following condition can be satisfied: NC≤1.7. Furthermore, the following condition can be satisfied: NC≤1.6.

In the miniature optical lens assembly of the present disclosure, the light blocking element can be a dark thin sheet being ring-shaped and can be disposed on an object side or an image side of an optical lens element. Therefore, it is favorable for absorbing the stray light, but the present disclosure is not limited thereto.

In the miniature optical lens assembly of the present disclosure, the annular spacer element can be disposed on the object side or the image side of the optical lens element so as to provide a larger space distance between the optical lens elements. Therefore, it is favorable for adjusting a proper space distance between the optical lens elements and assembling the optical lens assembly stably.

In the miniature optical lens assembly of the present disclosure, the barrel element can be a cylindrical shell for accommodating the optical lens elements, the light blocking element and the annular spacer element and have a function to position and protect the elements disposed therein, but the present disclosure is not limited thereto.

According to the miniature optical lens assembly of the present disclosure, when the average diameter of the nanocrystalline grains is DC, the following condition can be satisfied: 10 nm≤DC≤150 nm. In the miniature optical lens assembly of the present disclosure, a method to measure the average diameter of the nanocrystalline grains is observing the surface thereof by an electron microscope. Then, the nanocrystalline grains being granular or spherical are selected and a maximum diameter of a single grain is measured, and then at least five of the nanocrystalline grains within an area range of 1.2 $\mu m^2$ are selected so as to calculate the average diameter thereof. Therefore, the average diameter of the nanocrystalline grains can be controlled appropriately, the nanocrystalline grains with large average diameter can enhance the height drop of the surface, and the nanocrystalline grains with small average diameter can achieve a better effect for suppressing the stray light. Furthermore, the following condition can be satisfied: 20 nm≤DC≤150 nm. Furthermore, the following condition can be satisfied: 30 nm≤DC≤125 nm. Furthermore, the following condition can be satisfied: 40 nm≤DC≤100 nm. Furthermore, the following condition can be satisfied: 50 nm≤DC≤75 nm. Furthermore, the following condition can be satisfied: 39 nm≤DC≤88 nm.

According to the miniature optical lens assembly of the present disclosure, when the reflectance in a wavelength range of 380 nm-780 nm of the low reflection layer is R3878, the following condition can be satisfied: R3878≤0.30%. Therefore, it is favorable for absorbing a wide range of wavelengths of the stray light and maintaining the ultra-low reflectance of the surface, so that the image quality can be enhanced. Furthermore, the following condition can be satisfied: R3878≤0.25%. Furthermore, the following condition can be satisfied: R3878≤0.20%. Furthermore, the following condition can be satisfied: R3878≤0.16%. Furthermore, the following condition can be satisfied: R3878≤0.14%. Furthermore, the following condition can be satisfied: R3878≤0.15%.

According to the miniature optical lens assembly of the present disclosure, when a reflectance in a wavelength range of 380 nm-500 nm of the low reflection layer is R3850, the following condition can be satisfied: R3850≤0.40%. Therefore, it is favorable for effectively absorbing the stray light in the short wavelength range of the visible light, such as the stray light in a wavelength range of the blue visible light, so that a low reflectance of the surface in a particular wavelength range can be maintained. Furthermore, the following condition can be satisfied: R3850≤0.20%. Furthermore, the following condition can be satisfied: R3850≤0.15%.

According to the miniature optical lens assembly of the present disclosure, when a reflectance in a wavelength range of 400 nm-700 nm of the low reflection layer is R4070, the following condition can be satisfied: R4070≤0.50%. Therefore, it is favorable for effectively absorbing the stray light in the wavelength range of the visible light so as to maintain the ultra-low reflectance of the surface. Furthermore, the following condition can be satisfied: R4070≤0.25%. Furthermore, the following condition can be satisfied: R4070≤0.20%.

According to the miniature optical lens assembly of the present disclosure, when a reflectance in a wavelength range of 400 nm-550 nm of the low reflection layer is R4055, the following condition can be satisfied: R4055≤0.40%. Therefore, it is favorable for effectively absorbing the stray light in the short wavelength range of the visible light, such as the stray light in a wavelength range of the blue visible light, so that a low reflectance of the surface in a particular wavelength range can be maintained. Furthermore, the following condition can be satisfied: R4055≤0.20%. Furthermore, the following condition can be satisfied: R4055≤0.15%.

According to the miniature optical lens assembly of the present disclosure, when a reflectance in a wavelength range of 450 nm-650 nm of the low reflection layer is R4565, the following condition can be satisfied: R4565≤0.40%. Therefore, it is favorable for effectively absorbing the stray light so that a low reflectance of the surface in a particular wavelength range can be maintained. Furthermore, the following condition can be satisfied: R4565≤0.20%. Furthermore, the following condition can be satisfied: R4565≤0.15%.

According to the miniature optical lens assembly of the present disclosure, when a reflectance in a wavelength range of 500 nm-580 nm of the low reflection layer is R5058, the following condition can be satisfied: R5058≤0.50%. Therefore, it is favorable for effectively absorbing the stray light in a particular wavelength range, such as the stray light in a wavelength range of the green visible light, so that a low reflectance of the surface in a wavelength range can be maintained. Furthermore, the following condition can be satisfied: R5058≤0.25%. Furthermore, the following condition can be satisfied: R5058≤0.20%.

According to the miniature optical lens assembly of the present disclosure, when a reflectance in a wavelength range of 550 nm-700 nm of the low reflection layer is R5570, the following condition can be satisfied: R5570≤0.30%. Therefore, it is favorable for effectively absorbing the stray light in the long wavelength range of the visible light, such as the stray light in a wavelength range of the red visible light, so that a low reflectance of the surface in a particular wavelength range can be maintained. Furthermore, the following condition can be satisfied: R5570≤0.20%. Furthermore, the following condition can be satisfied: R5570≤0.15%.

According to the miniature optical lens assembly of the present disclosure, when a reflectance in a wavelength range of 580 nm-780 nm of the low reflection layer is R5878, the following condition can be satisfied: R5878≤0.80%. Therefore, it is favorable for effectively absorbing the stray light in the long wavelength range of the visible light, such as the stray light in a wavelength range of the red visible light and the near infrared light, so that a low reflectance of the surface in a particular wavelength range can be maintained. Furthermore, the following condition can be satisfied: R5878≤0.40%. Furthermore, the following condition can be satisfied: R5878≤0.20%.

According to the miniature optical lens assembly of the present disclosure, the nanocrystalline grains can be made of metal oxide material. Therefore, the reflectance thereof can be significantly reduced, and the surface hardness and the wear resistance thereof can be further enhanced by the particular material.

According to the miniature optical lens assembly of the present disclosure, the nanocrystalline grains can be made of $SiO_2$. Therefore, the surface refractive index can be changed so as to achieve a gradual distribution of the refractive index between the surface of the optical element and the air, so that the reflectance of the surface can be reduced significantly.

According to the miniature optical lens assembly of the present disclosure, the nanocrystalline grains can be made of $Al_2O_3$. Therefore, the surface refractive index can be changed so as to achieve a gradual distribution of the refractive index between the surface of the optical element and the air, so that the reflectance of the surface can be reduced significantly.

According to the miniature optical lens assembly of the present disclosure, the nanocrystalline grains can be made of $TiO_2$. Therefore, the reflectance of the surface can be reduced.

According to the miniature optical lens assembly of the present disclosure, the nanocrystalline grains can be made of the metal nitride material. Therefore, the reflectance of the surface can be reduced, and the surface hardness and the wear resistance thereof can be further enhanced.

Each of the aforementioned features of the miniature optical lens assembly of the present disclosure can be utilized in various combinations for achieving the corresponding effects.

The present disclosure provides an imaging apparatus including the aforementioned miniature optical lens assembly and an image sensor. The image sensor is disposed on an image surface of the miniature optical lens assembly. More preferably, the imaging apparatus can further include a barrel member, a holder member, or a combination thereof.

The present disclosure provides an electronic device including the aforementioned imaging apparatus. Therefore, the image quality can be effectively enhanced. More preferably, the electronic device can further include a control unit, a display, a storage unit, a random-access memory (RAM), or the combination thereof.

According to the above description of the present disclosure, the following specific embodiments are provided for further explanation.

1st Embodiment to 10th Embodiment

Figures 1, 2:
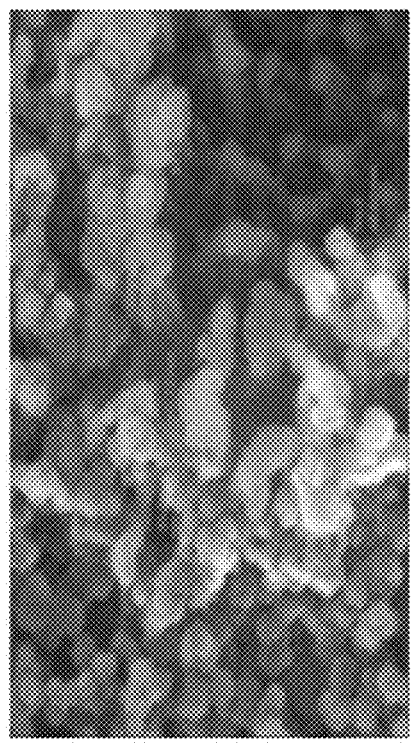
Figure 1:
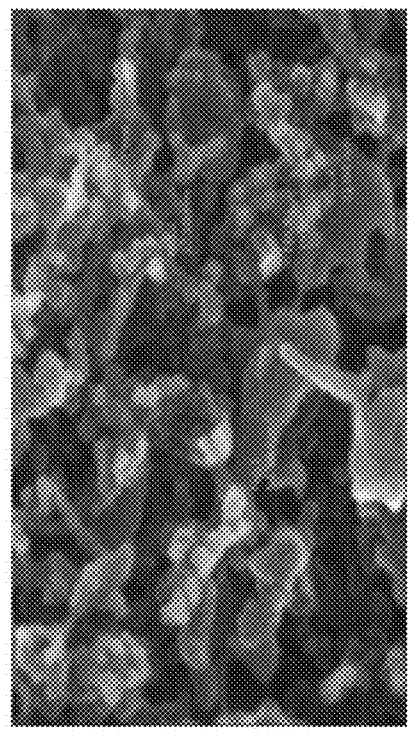
Figures 1, 2, 3, 4:
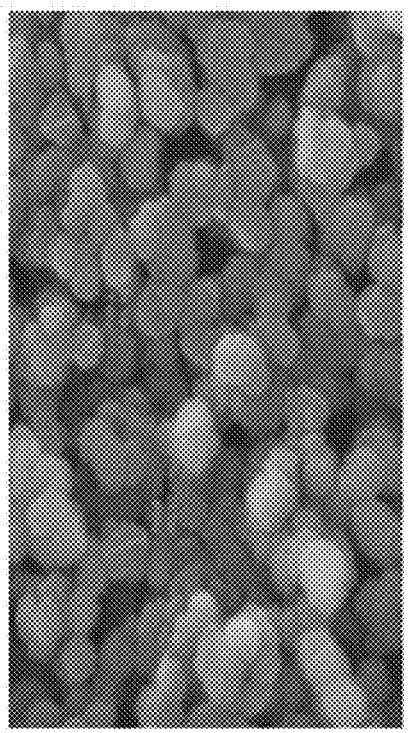
Figures 1, 2, 3:
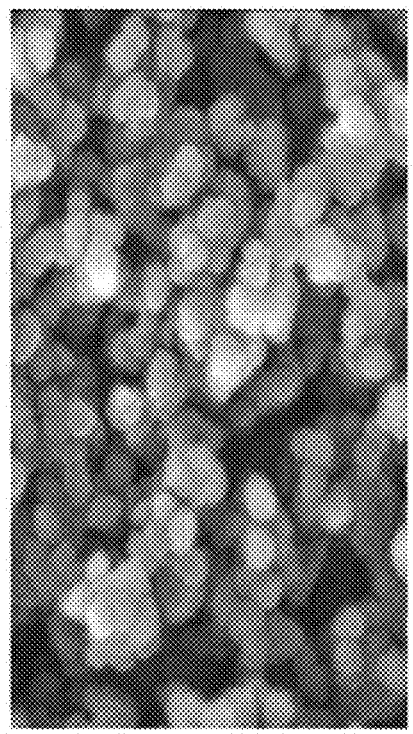
Figures 1, 2, 3, 4, 5, 6:
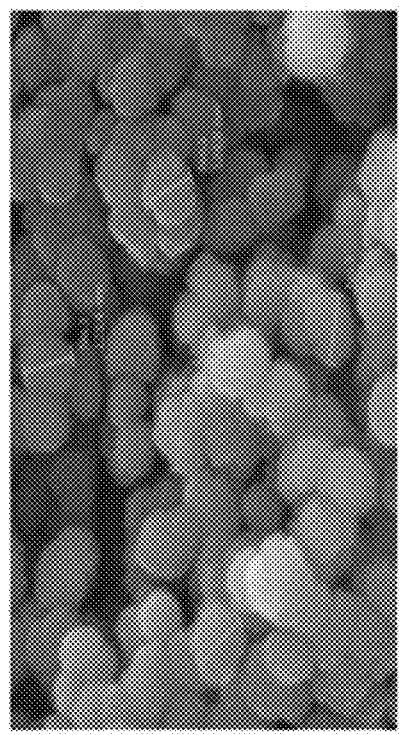
Figures 1, 2, 3, 4, 5:
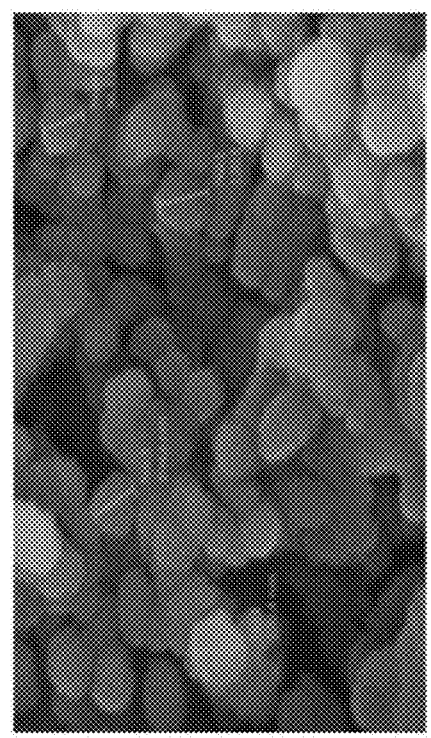
Figures 1, 2, 3, 4, 5, 6, 7:
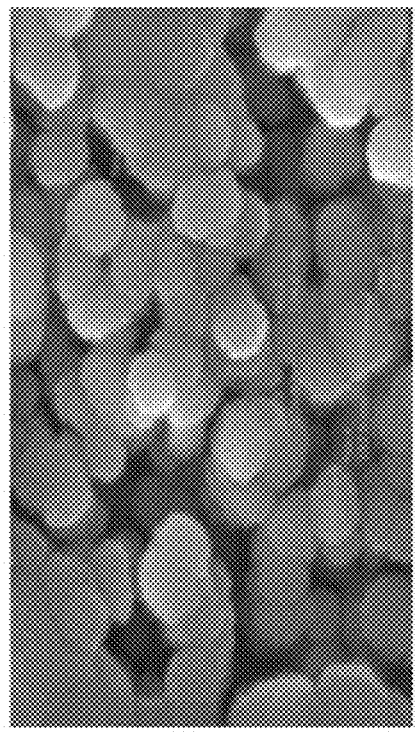
Figures 1, 2, 3, 4, 5, 6, 7, 8:
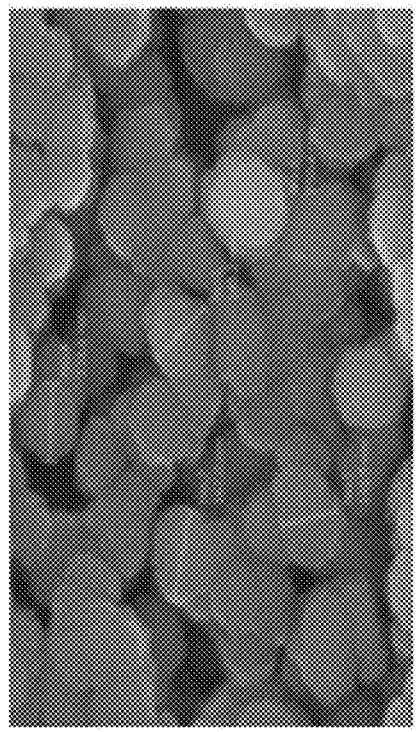
Figures 1, 2, 3, 4, 5, 6, 7, 8, 9, 10:
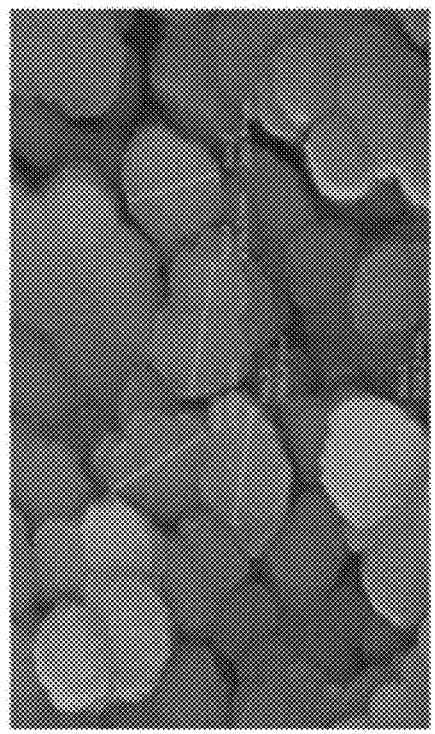
Figures 1, 2, 3, 4, 5, 6, 7, 8, 9:
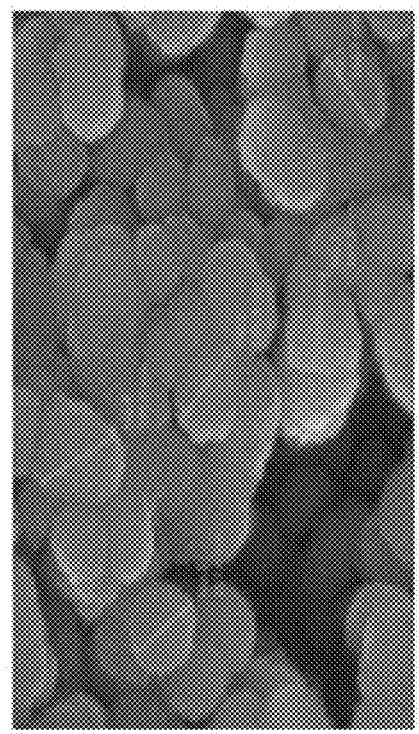
Figure 2:
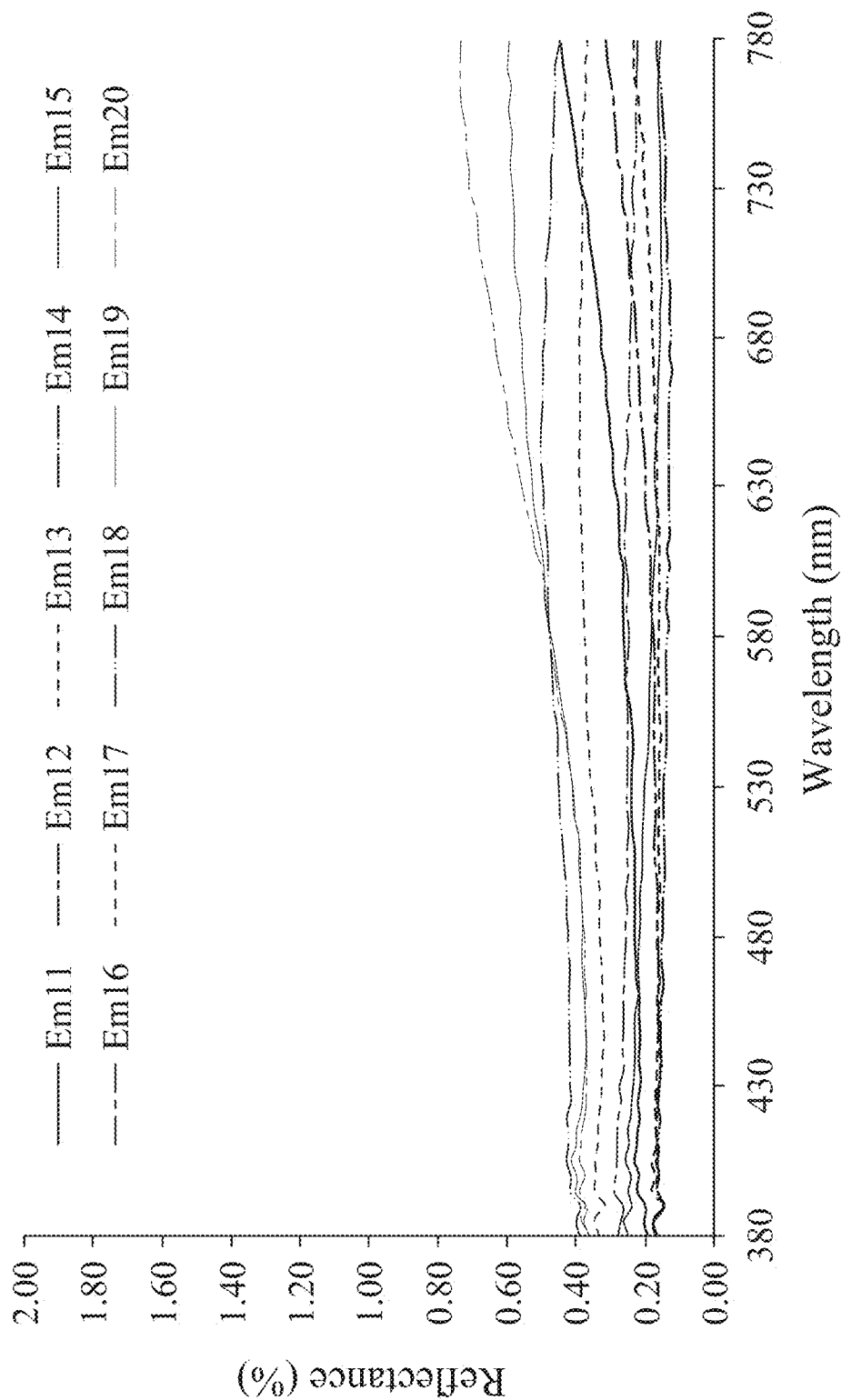
Figures 1, 2:
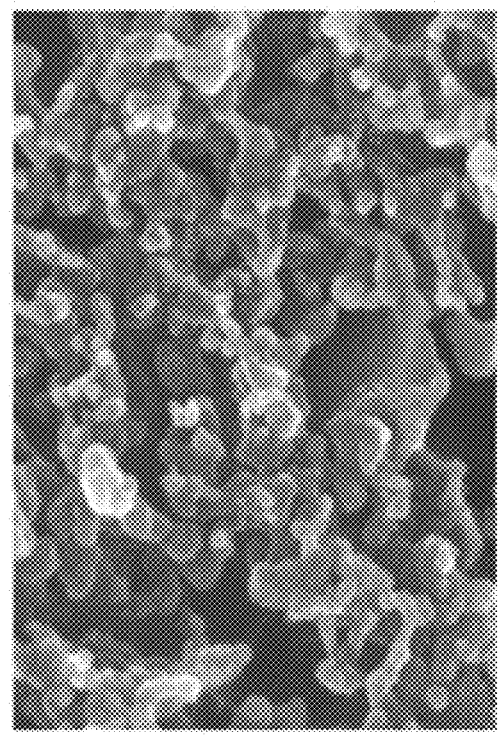
Figure 2:
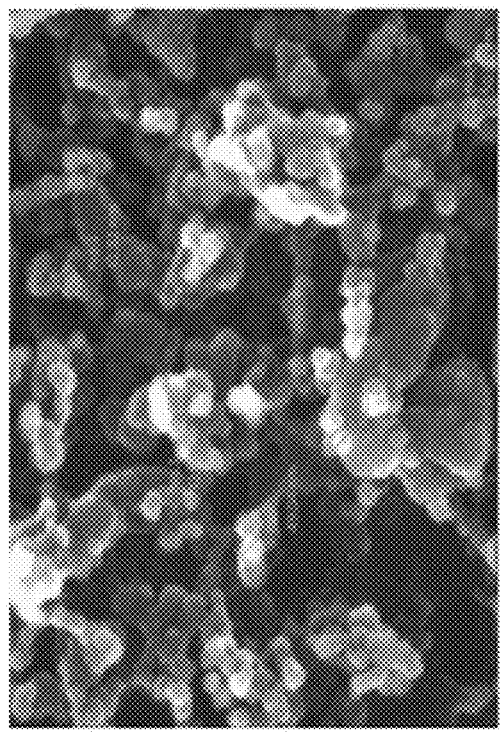
Figures 2, 3, 4:
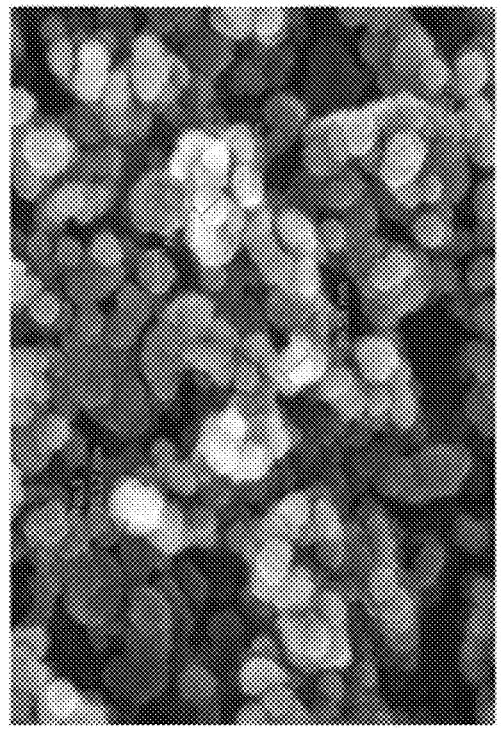
Figures 2, 3:
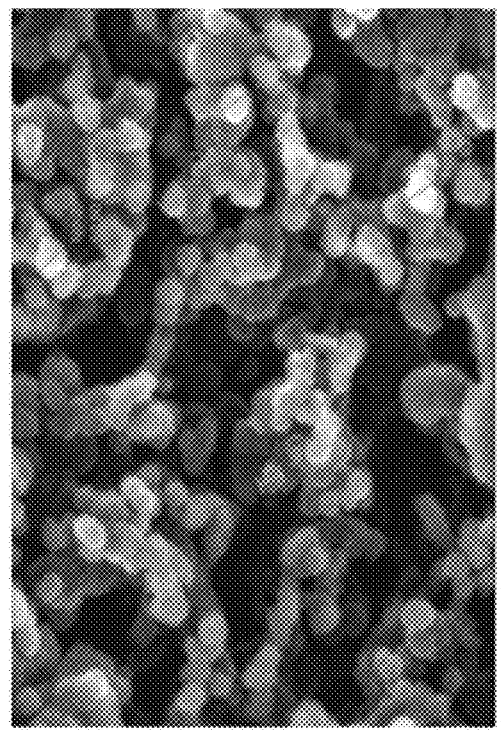
Figures 2, 3, 4, 5, 6:
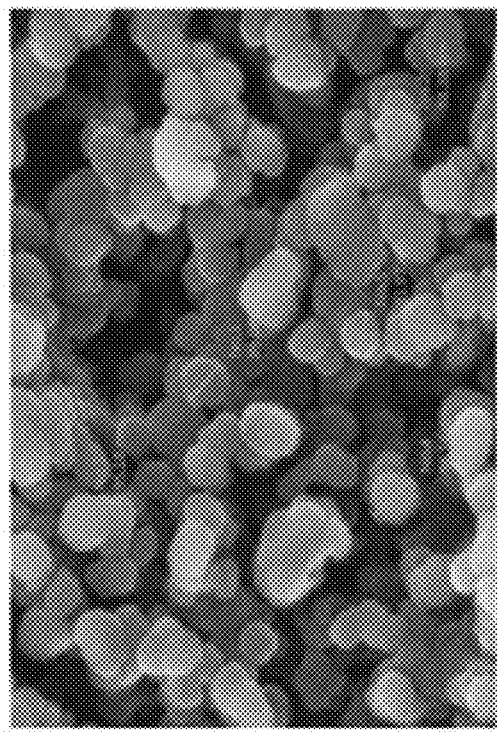
Figures 2, 3, 4, 5:
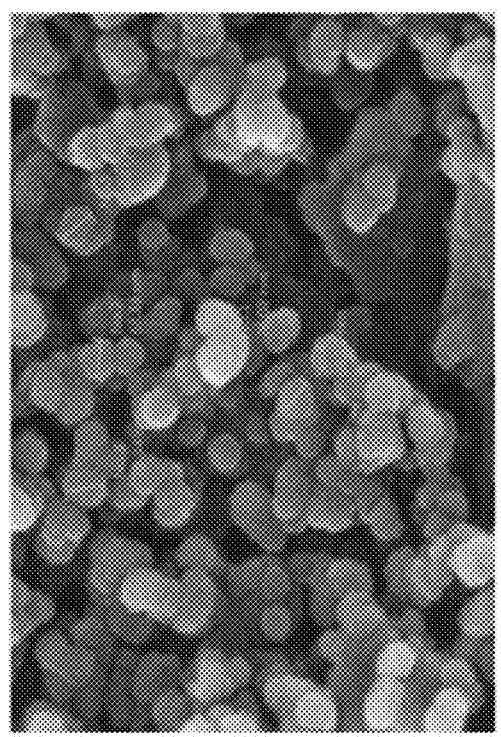
Figures 2, 3, 4, 5, 6, 7, 8:
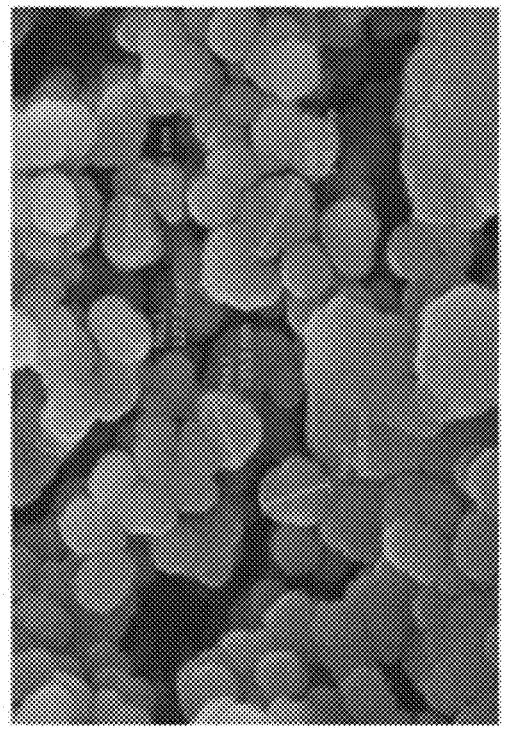
Figures 2, 3, 4, 5, 6, 7:
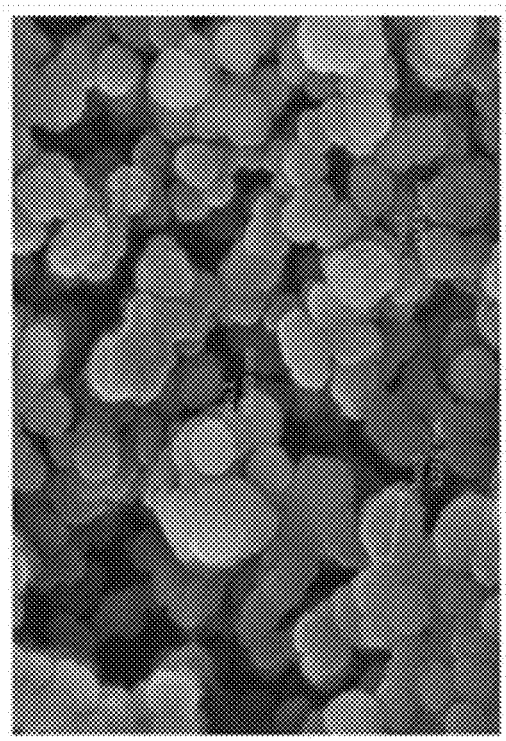
Figures 2, 3, 4, 5, 6, 7, 8, 9, 10:
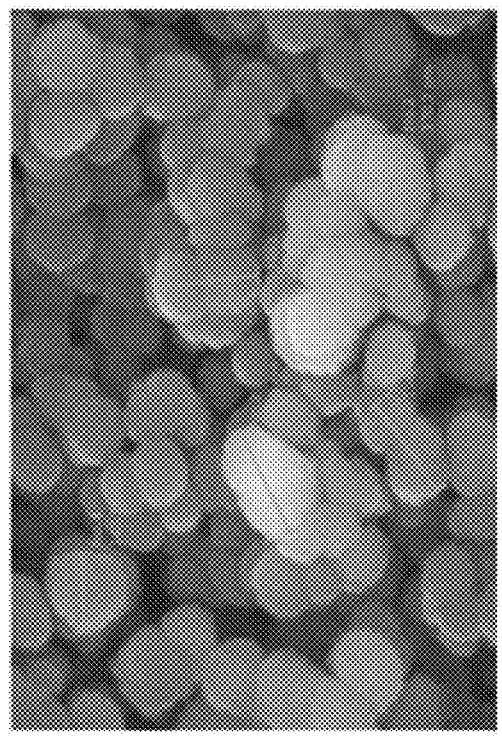
Figures 2, 3, 4, 5, 6, 7, 8, 9:
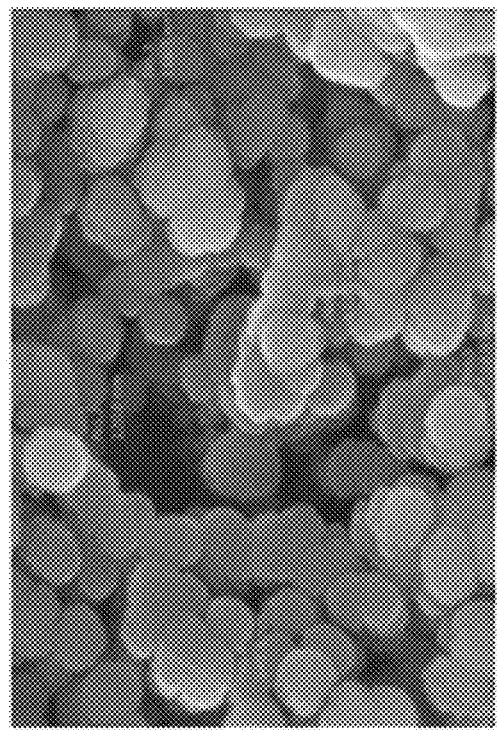
Figure 3:
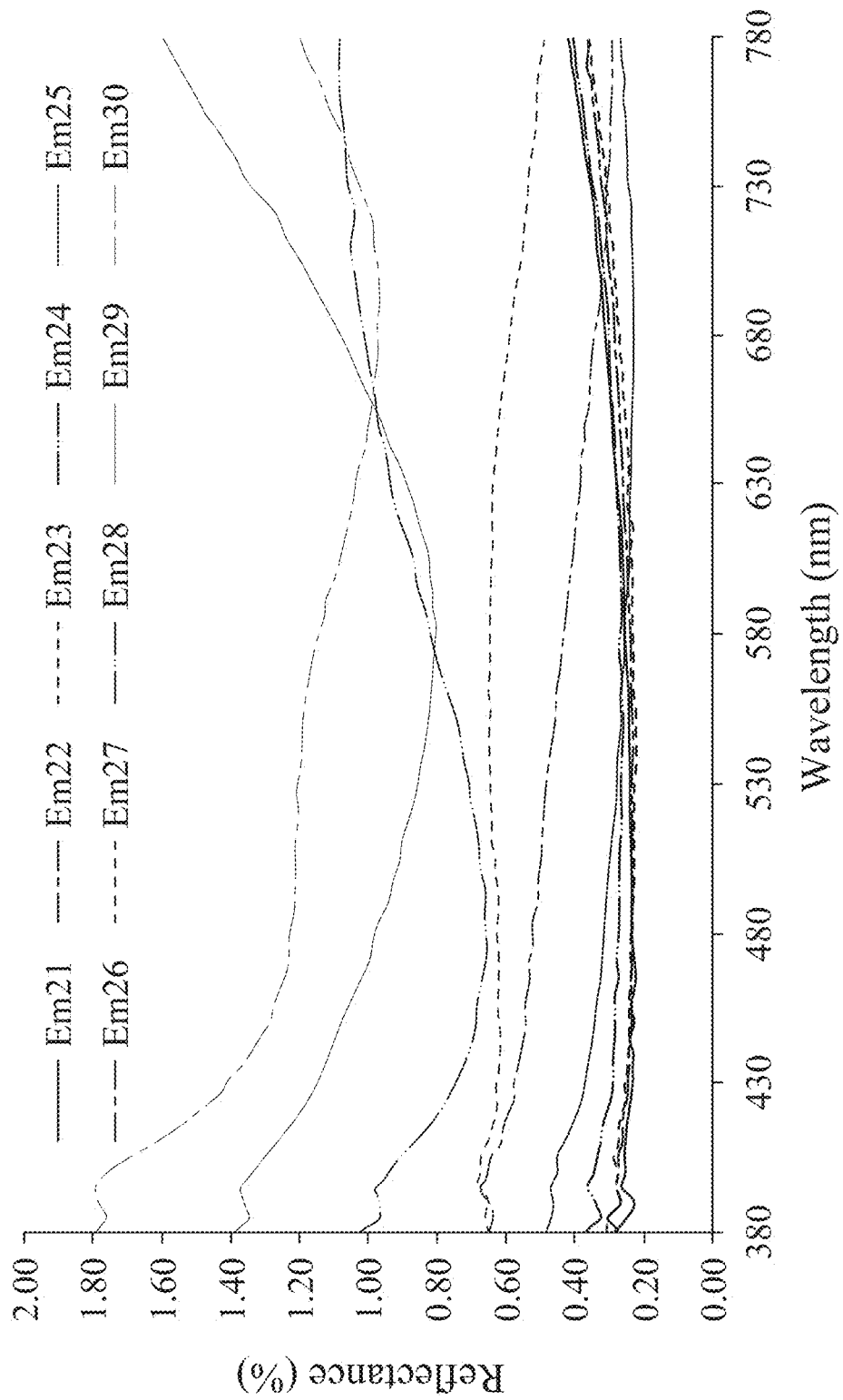
Figures 2, 3:
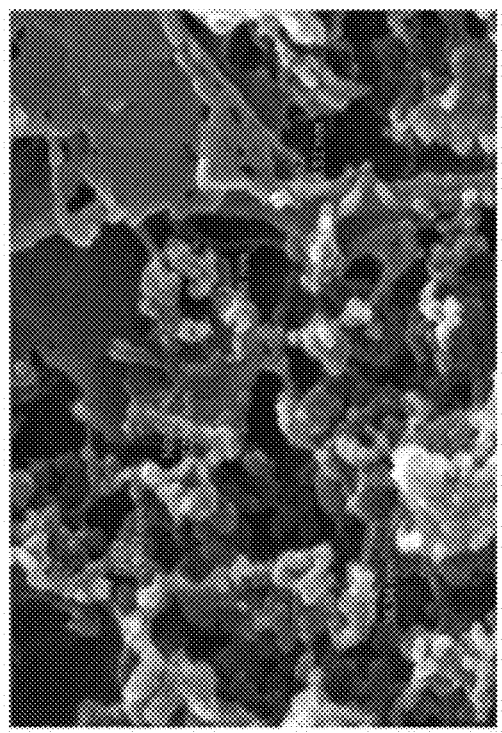
Figures 1, 3:
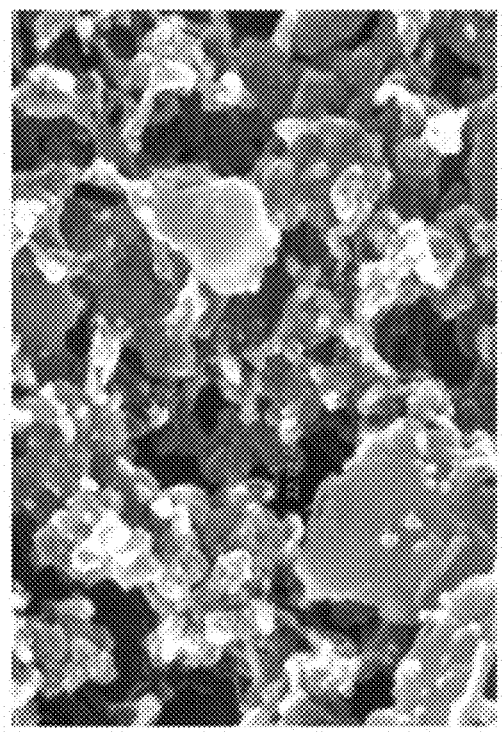
Figures 3, 4:
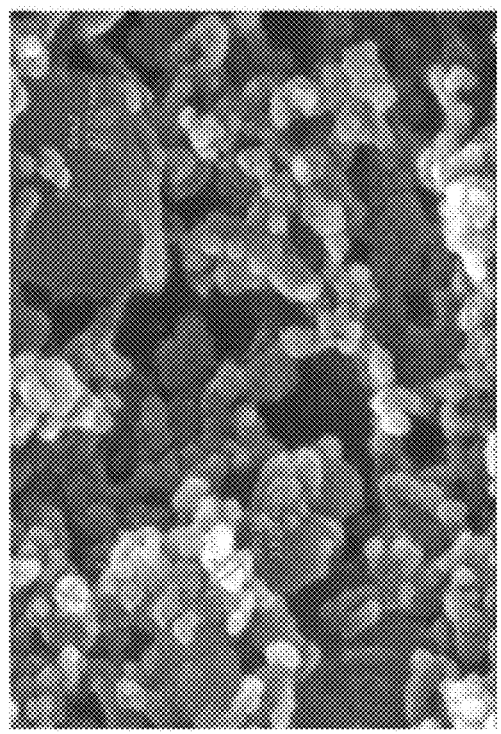
Figure 3:
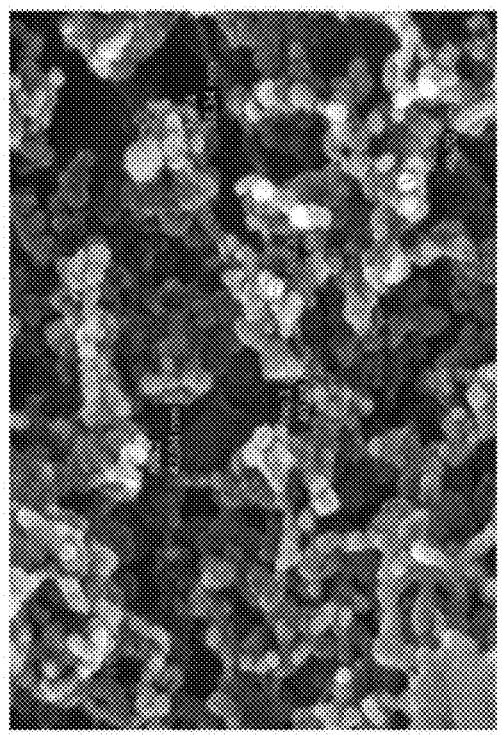
Figures 3, 4, 5, 6:
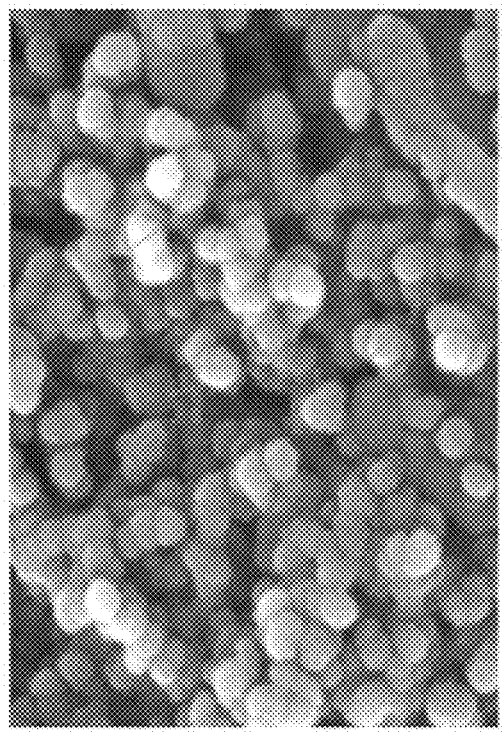
Figures 3, 4, 5:
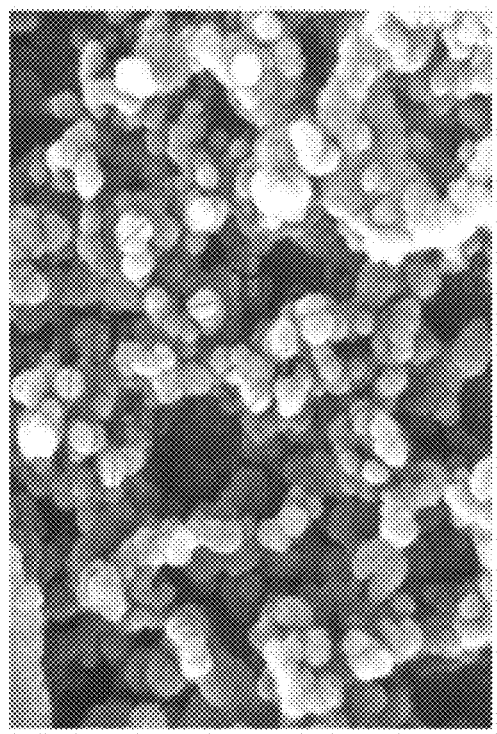
Figures 3, 4, 5, 6, 7, 8:
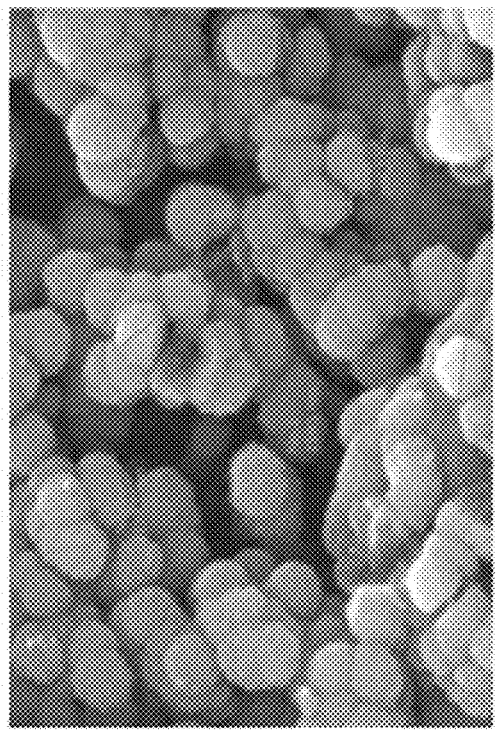
Figures 3, 4, 5, 6, 7:
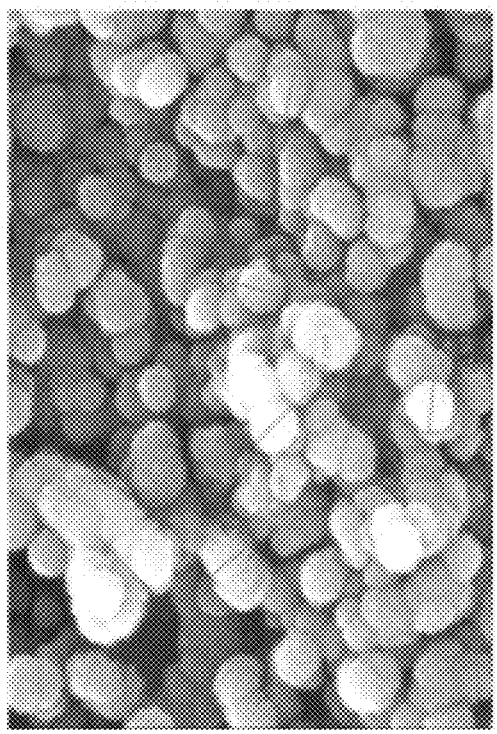
Figures 3, 4, 5, 6, 7, 8, 9, 10:
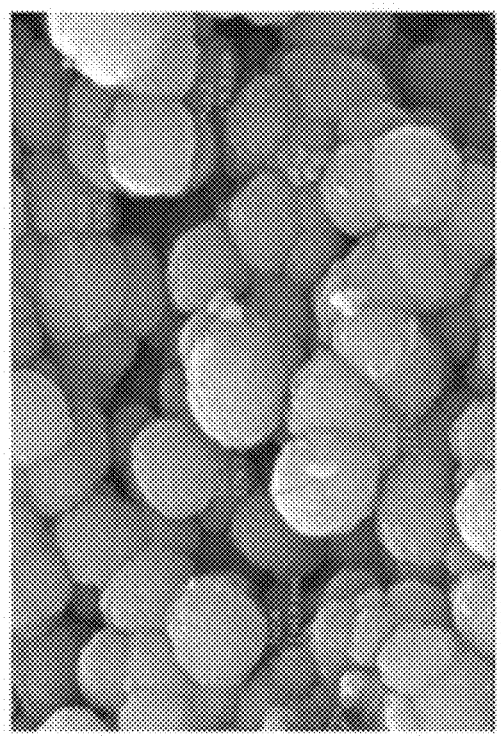
Figures 3, 4, 5, 6, 7, 8, 9:
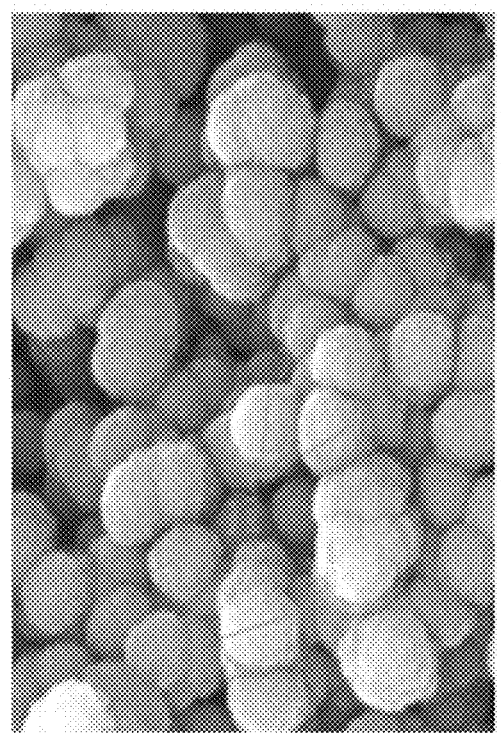
Figure 4:
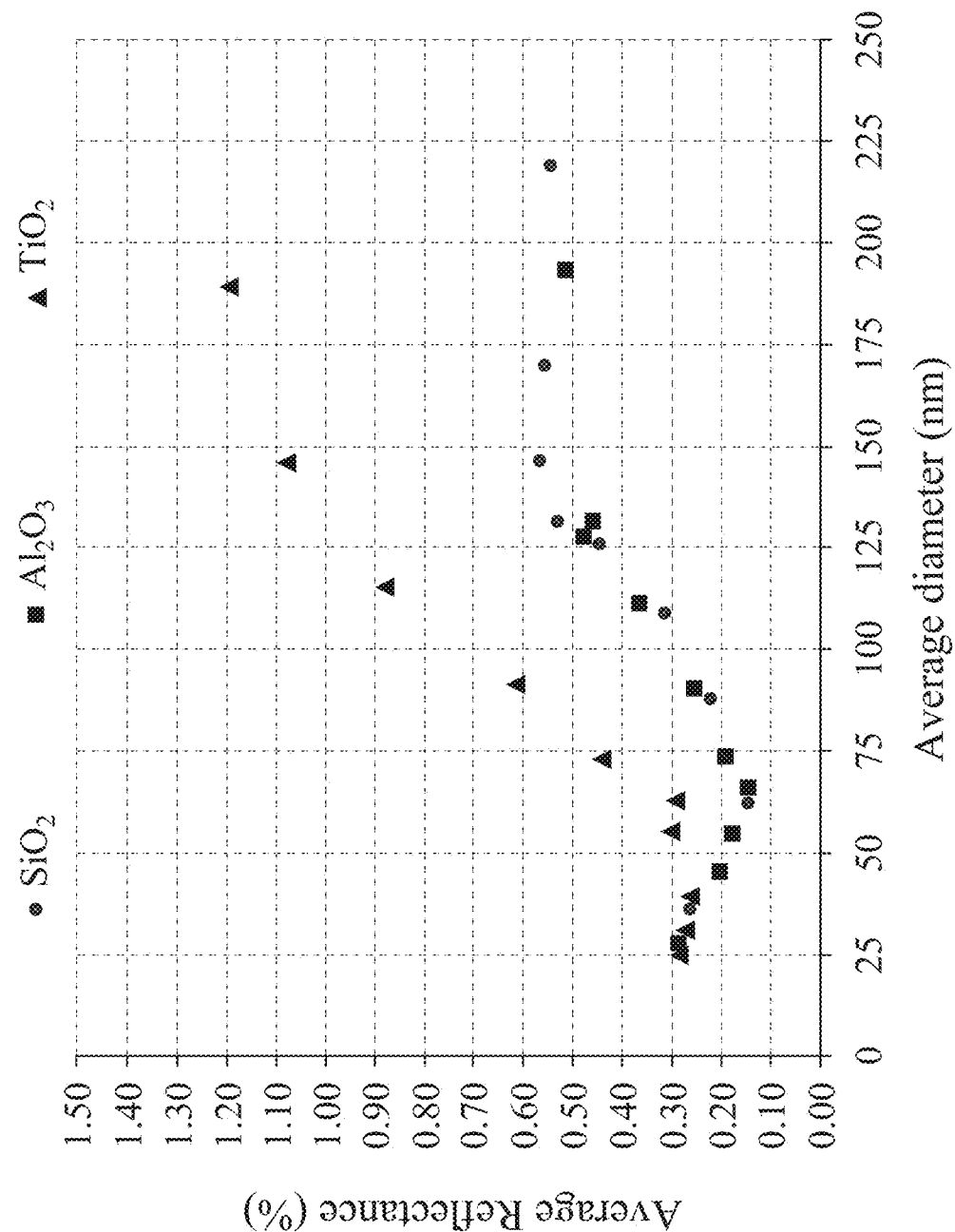
Figure 5:
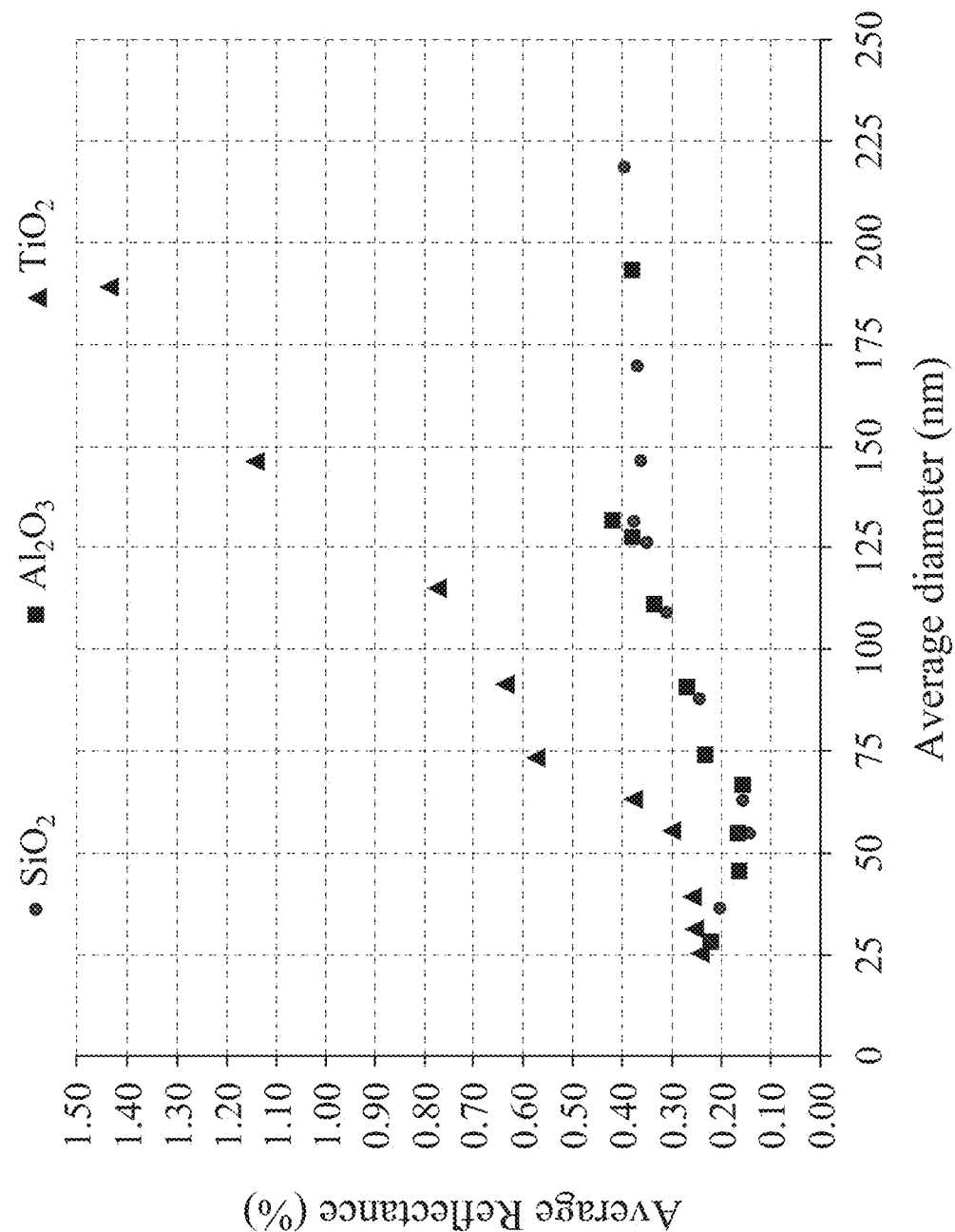
Figure 6:
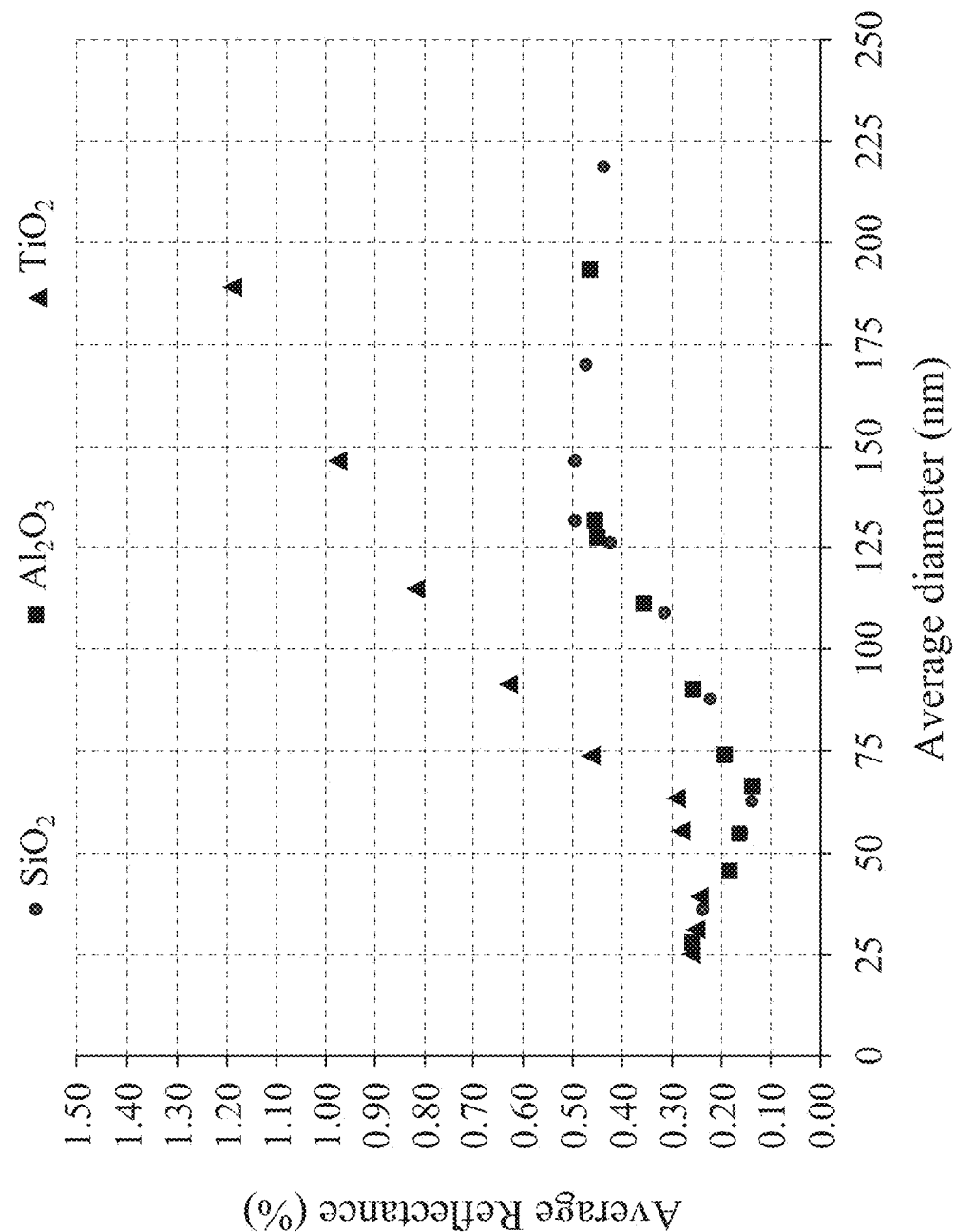
Figure 7:
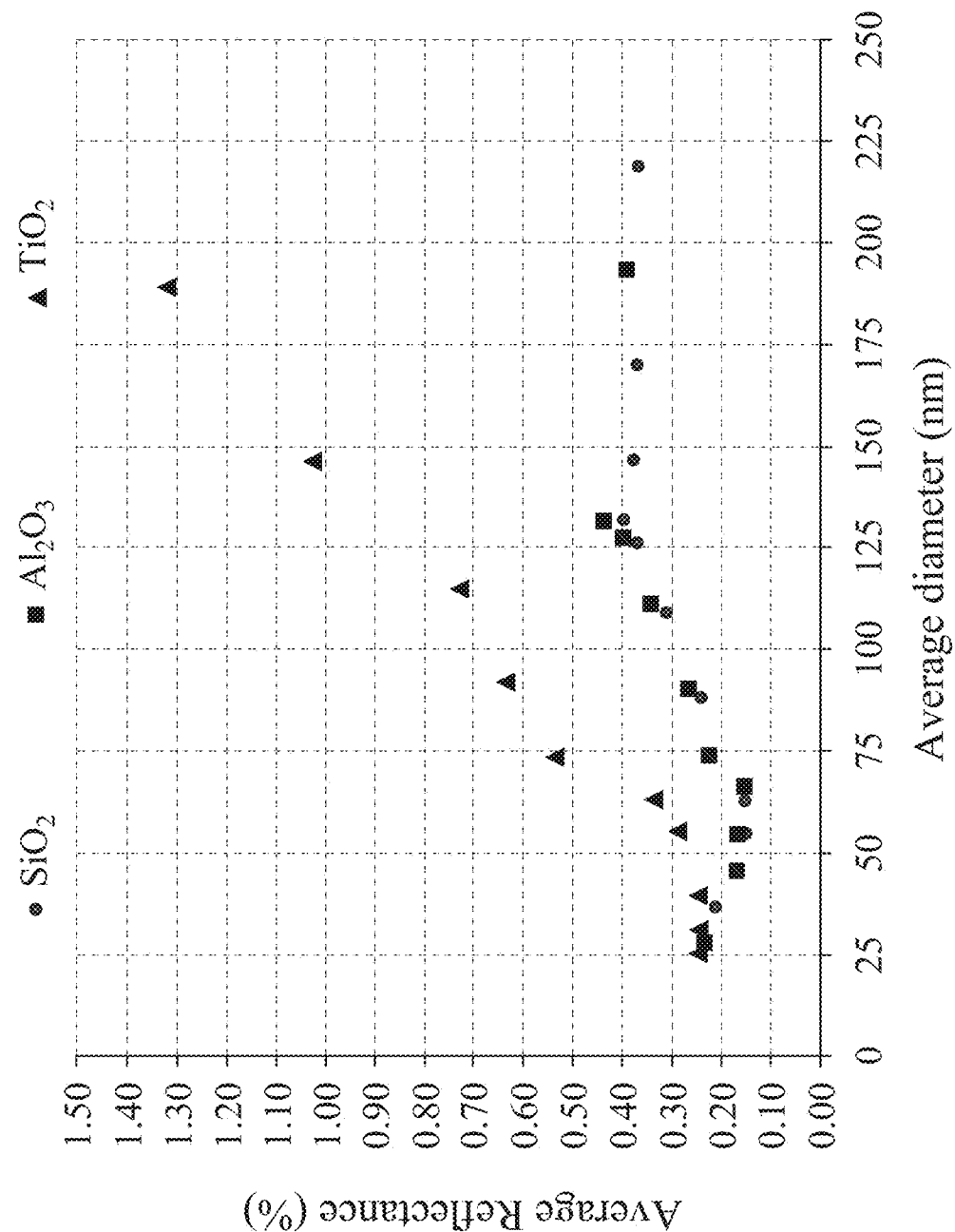
Figure 8:
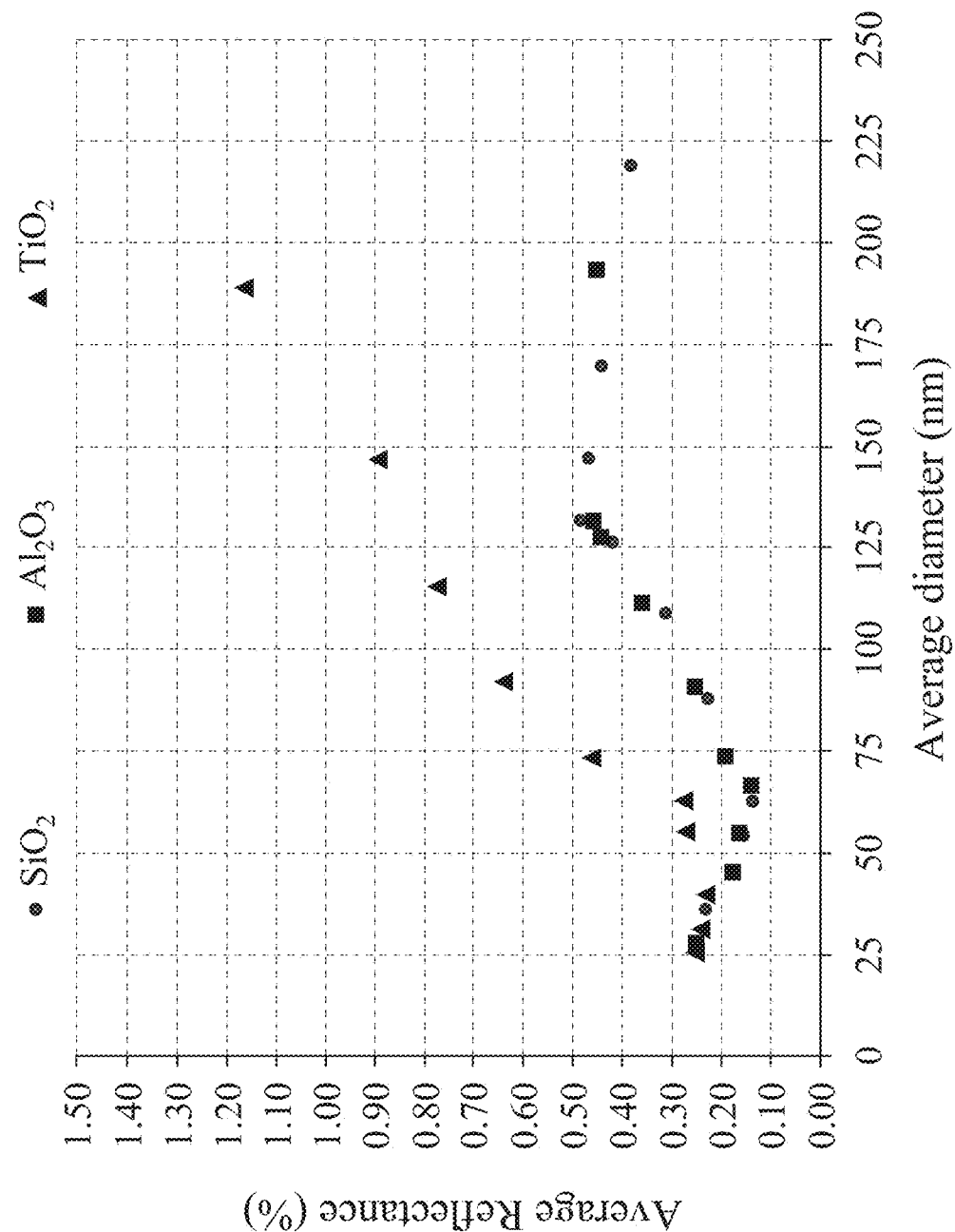
Figure 9:
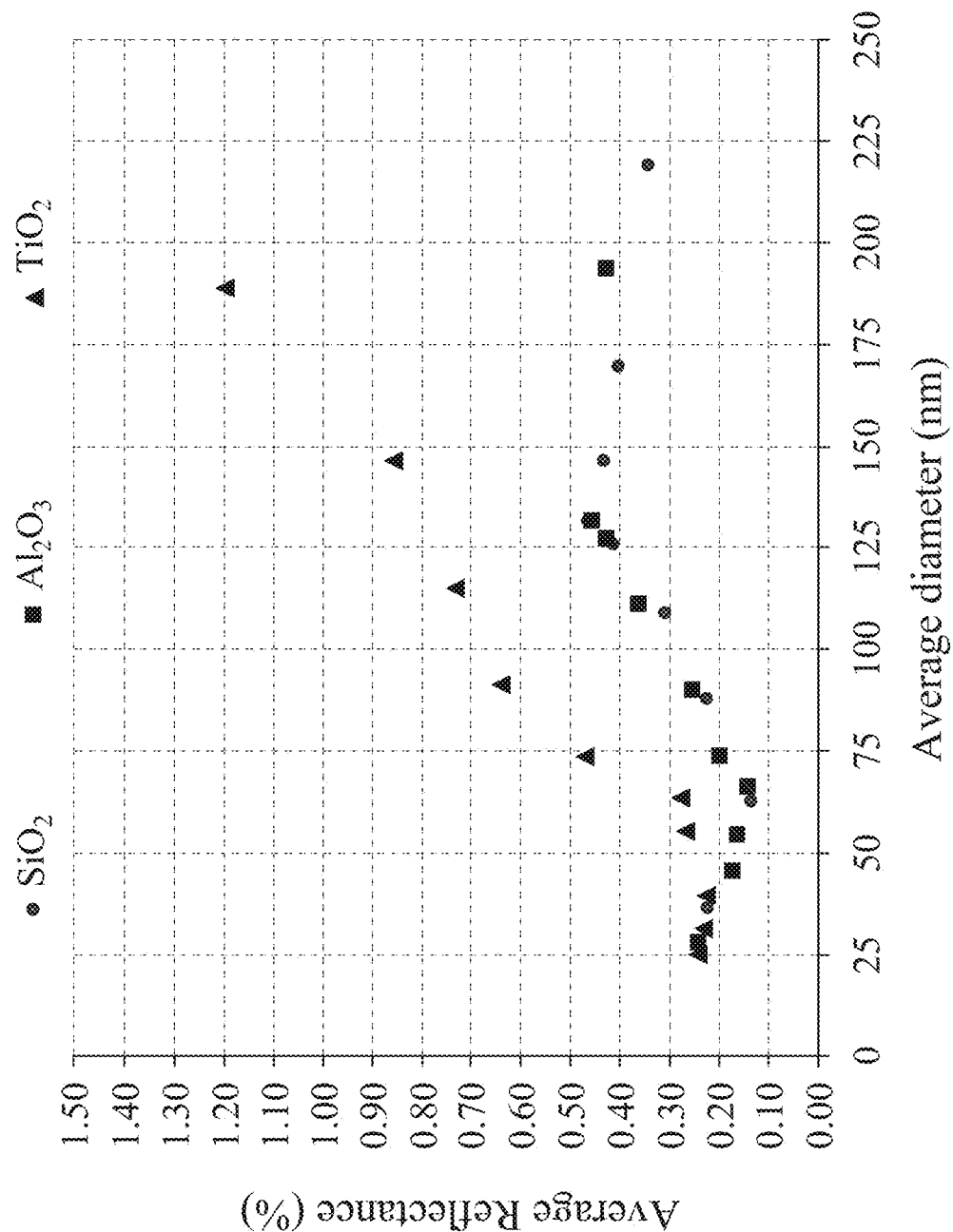
Figure 10:
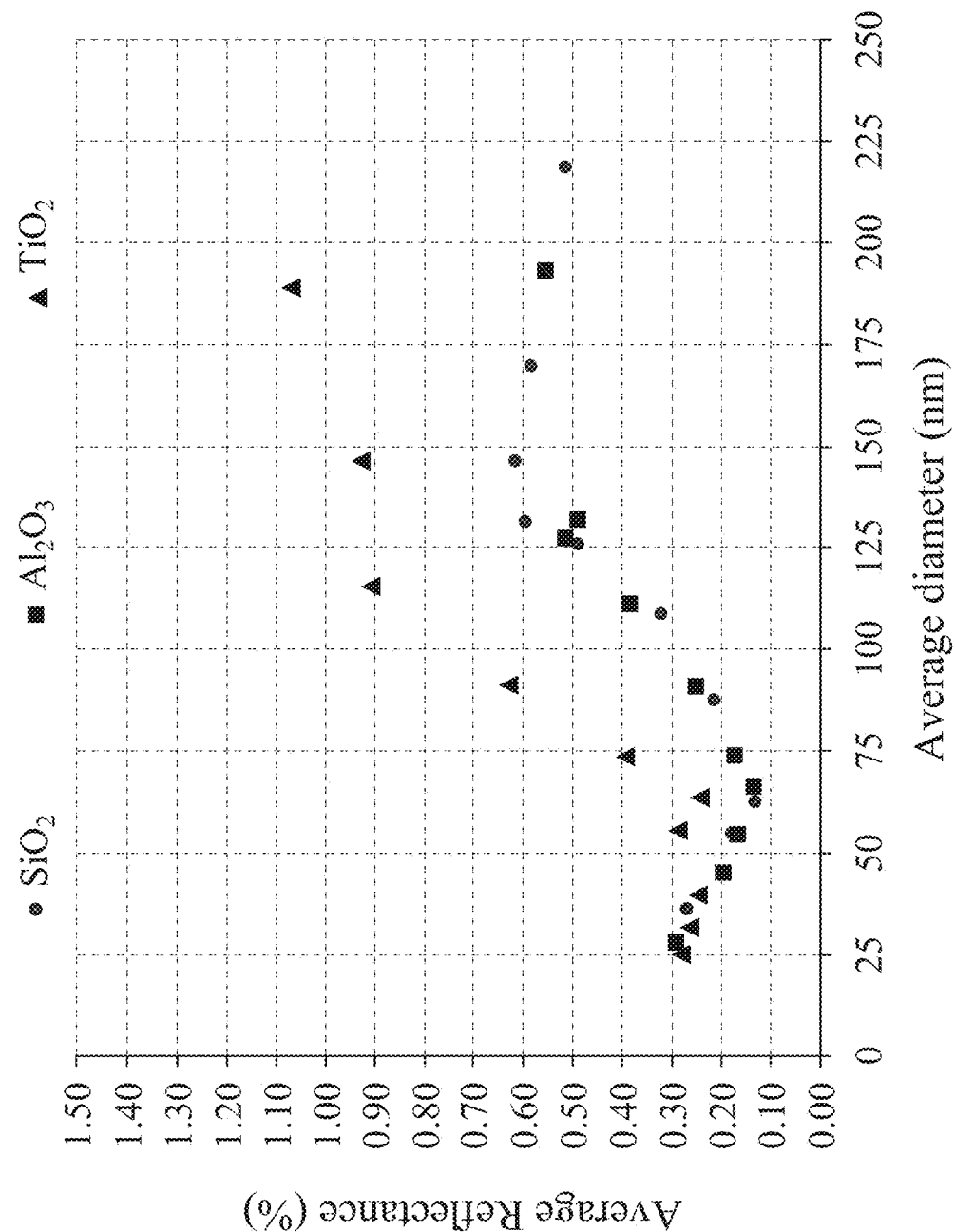

Please refer to FIG. 1 to FIG. 1-10. FIG. 1 shows the values of reflectance in a wavelength range of 380 nm-780 nm of a low reflection layer according to the 1st embodiment to the 10th embodiment of the present disclosure. FIG. 1-1 shows a surface diagram of crystalline grains according to the 1st embodiment of the present disclosure. FIG. 1-2 shows a surface diagram of crystalline grains according to the 2nd embodiment of the present disclosure. FIG. 1-3 shows a surface diagram of crystalline grains according to the 3rd embodiment of the present disclosure. FIG. 1-4 shows a surface diagram of crystalline grains according to the 4th embodiment of the present disclosure. FIG. 1-5 shows a surface diagram of crystalline grains according to the 5th embodiment of the present disclosure. FIG. 1-6 shows a surface diagram of crystalline grains according to the 6th embodiment of the present disclosure. FIG. 1-7 shows a surface diagram of crystalline grains according to the 7th embodiment of the present disclosure. FIG. 1-8 shows a surface diagram of crystalline grains according to the 8th embodiment of the present disclosure. FIG. 1-9 shows a surface diagram of crystalline grains according to the 9th embodiment of the present disclosure. FIG. 1-10 shows a surface diagram of crystalline grains according to the 10th embodiment of the present disclosure.

In the nanocrystalline grains of the 1st embodiment to the 10th embodiment, the nanocrystalline grains are made of $SiO_2$. Furthermore, in FIG. 1-1 to FIG. 1-10, the size of the nanocrystalline grains is about 0.95 μm in width and 1.27 μm in length, and the total area of FIG. 1-1 to FIG. 1-10 is about 1.2 μm².

Please refer to Table 1 as follow.

TABLE 1

| | Nanocrystalline grains | | | | | | | | | |
|---|---|---|---|---|---|---|---|---|---|---|
| | Em1 | Em2 | Em3 | Em4 | Em5 | Em6 | Em7 | Em8 | Em9 | Em10 |
| | | | | | $SiO_2$ | | | | | |
| DC (nm) | 36 | 55 | 63 | 88 | 109 | 126 | 132 | 147 | 170 | 219 |
| R3878 | 0.26 | 0.18 | 0.15 | 0.22 | 0.32 | 0.45 | 0.53 | 0.56 | 0.56 | 0.54 |
| R3850 | 0.20 | 0.14 | 0.16 | 0.25 | 0.31 | 0.35 | 0.37 | 0.36 | 0.37 | 0.40 |
| R4070 | 0.24 | 0.16 | 0.14 | 0.23 | 0.32 | 0.43 | 0.49 | 0.50 | 0.47 | 0.44 |
| R4055 | 0.21 | 0.15 | 0.15 | 0.24 | 0.31 | 0.37 | 0.39 | 0.38 | 0.36 | 0.36 |
| R4565 | 0.23 | 0.16 | 0.14 | 0.22 | 0.31 | 0.42 | 0.48 | 0.47 | 0.44 | 0.39 |
| R5058 | 0.23 | 0.16 | 0.14 | 0.23 | 0.31 | 0.41 | 0.46 | 0.43 | 0.40 | 0.34 |
| R5570 | 0.27 | 0.18 | 0.13 | 0.21 | 0.32 | 0.49 | 0.59 | 0.62 | 0.58 | 0.51 |
| R5878 | 0.31 | 0.21 | 0.14 | 0.20 | 0.32 | 0.52 | 0.65 | 0.73 | 0.73 | 0.71 |

Table 1 shows the values of parameters of the optical element of the miniature optical lens assembly according to the 1st embodiment to the 10th embodiment of the present disclosure, wherein "Em1" to "Em10" therein present the 1st embodiment to the 10th embodiment, respectively, DC is an average diameter of the nanocrystalline grains, R3878 is a reflectance in a wavelength range of 380 nm-780 nm of the low reflection layer, R3850 is a reflectance in a wavelength range of 380 nm-500 nm of the low reflection layer, R4070 is a reflectance in a wavelength range of 400 nm-700 nm of the low reflection layer, R4055 is a reflectance in a wavelength range of 400 nm-550 nm of the low reflection layer, R4565 is a reflectance in a wavelength range of 450 nm-650 nm of the low reflection layer, R5058 is a reflectance in a wavelength range of 500 nm-580 nm of the low reflection layer, R5570 is a reflectance in a wavelength range of 550 nm-700 nm of the low reflection layer, and R5878 is a reflectance in a wavelength range of 580 nm-780 nm of the low reflection layer.

Please refer Table 2, Table 2 shows the values of the reflectance in a wavelength range of 380 nm-780 nm of the low reflection layer according to the 1st embodiment to the 10th embodiment.

TABLE 2

| | Reflectance (%) | | | | | | | | | |
|---|---|---|---|---|---|---|---|---|---|---|
| Wavelength (nm) | Em1 | Em2 | Em3 | Em4 | Em5 | Em6 | Em7 | Em8 | Em9 | Em10 |
| 380 | 0.18 | 0.13 | 0.18 | 0.26 | 0.31 | 0.31 | 0.40 | 0.40 | 0.45 | 0.51 |
| 385 | 0.20 | 0.14 | 0.17 | 0.27 | 0.31 | 0.34 | 0.38 | 0.37 | 0.43 | 0.49 |
| 390 | 0.18 | 0.14 | 0.19 | 0.27 | 0.33 | 0.35 | 0.37 | 0.37 | 0.41 | 0.48 |
| 395 | 0.20 | 0.13 | 0.18 | 0.27 | 0.33 | 0.35 | 0.40 | 0.39 | 0.43 | 0.48 |
| 400 | 0.20 | 0.15 | 0.18 | 0.27 | 0.33 | 0.35 | 0.37 | 0.38 | 0.40 | 0.46 |
| 405 | 0.21 | 0.15 | 0.15 | 0.26 | 0.31 | 0.34 | 0.37 | 0.37 | 0.39 | 0.46 |
| 410 | 0.19 | 0.14 | 0.16 | 0.25 | 0.31 | 0.34 | 0.36 | 0.37 | 0.38 | 0.44 |
| 415 | 0.21 | 0.15 | 0.17 | 0.25 | 0.32 | 0.34 | 0.36 | 0.37 | 0.37 | 0.42 |
| 420 | 0.20 | 0.14 | 0.15 | 0.25 | 0.31 | 0.34 | 0.35 | 0.35 | 0.36 | 0.41 |
| 425 | 0.20 | 0.15 | 0.16 | 0.25 | 0.31 | 0.33 | 0.35 | 0.35 | 0.35 | 0.40 |
| 430 | 0.20 | 0.15 | 0.16 | 0.25 | 0.32 | 0.34 | 0.35 | 0.35 | 0.34 | 0.39 |
| 435 | 0.20 | 0.14 | 0.15 | 0.24 | 0.31 | 0.34 | 0.35 | 0.34 | 0.34 | 0.38 |
| 440 | 0.20 | 0.14 | 0.15 | 0.24 | 0.30 | 0.34 | 0.36 | 0.34 | 0.34 | 0.38 |
| 445 | 0.20 | 0.14 | 0.15 | 0.24 | 0.30 | 0.34 | 0.36 | 0.34 | 0.34 | 0.37 |
| 450 | 0.20 | 0.14 | 0.15 | 0.24 | 0.30 | 0.34 | 0.36 | 0.34 | 0.34 | 0.36 |
| 455 | 0.20 | 0.14 | 0.15 | 0.24 | 0.30 | 0.34 | 0.37 | 0.35 | 0.34 | 0.36 |
| 460 | 0.21 | 0.14 | 0.15 | 0.24 | 0.30 | 0.35 | 0.37 | 0.35 | 0.35 | 0.36 |
| 465 | 0.21 | 0.15 | 0.15 | 0.24 | 0.30 | 0.36 | 0.38 | 0.35 | 0.34 | 0.35 |
| 470 | 0.20 | 0.14 | 0.15 | 0.23 | 0.30 | 0.35 | 0.38 | 0.36 | 0.35 | 0.35 |
| 475 | 0.20 | 0.14 | 0.15 | 0.23 | 0.30 | 0.36 | 0.38 | 0.36 | 0.35 | 0.34 |
| 480 | 0.21 | 0.15 | 0.15 | 0.24 | 0.31 | 0.36 | 0.39 | 0.36 | 0.35 | 0.35 |
| 485 | 0.21 | 0.15 | 0.15 | 0.23 | 0.31 | 0.37 | 0.39 | 0.36 | 0.35 | 0.34 |
| 490 | 0.21 | 0.15 | 0.15 | 0.24 | 0.30 | 0.37 | 0.40 | 0.37 | 0.35 | 0.34 |
| 495 | 0.21 | 0.15 | 0.14 | 0.23 | 0.30 | 0.37 | 0.40 | 0.37 | 0.35 | 0.33 |
| 500 | 0.21 | 0.15 | 0.15 | 0.23 | 0.31 | 0.38 | 0.41 | 0.38 | 0.36 | 0.33 |
| 505 | 0.21 | 0.16 | 0.14 | 0.23 | 0.31 | 0.38 | 0.41 | 0.38 | 0.36 | 0.33 |
| 510 | 0.21 | 0.15 | 0.14 | 0.23 | 0.31 | 0.38 | 0.42 | 0.39 | 0.37 | 0.33 |
| 515 | 0.21 | 0.15 | 0.14 | 0.23 | 0.31 | 0.39 | 0.42 | 0.40 | 0.37 | 0.33 |
| 520 | 0.22 | 0.16 | 0.14 | 0.23 | 0.31 | 0.39 | 0.43 | 0.40 | 0.38 | 0.33 |
| 525 | 0.22 | 0.16 | 0.14 | 0.23 | 0.31 | 0.40 | 0.44 | 0.41 | 0.38 | 0.33 |
| 530 | 0.22 | 0.16 | 0.14 | 0.23 | 0.31 | 0.41 | 0.45 | 0.42 | 0.39 | 0.33 |
| 535 | 0.22 | 0.16 | 0.14 | 0.23 | 0.31 | 0.41 | 0.45 | 0.42 | 0.39 | 0.33 |
| 540 | 0.23 | 0.16 | 0.14 | 0.23 | 0.31 | 0.42 | 0.46 | 0.43 | 0.40 | 0.33 |
| 545 | 0.22 | 0.15 | 0.13 | 0.22 | 0.31 | 0.42 | 0.47 | 0.43 | 0.40 | 0.33 |
| 550 | 0.23 | 0.16 | 0.14 | 0.22 | 0.31 | 0.42 | 0.48 | 0.44 | 0.41 | 0.34 |
| 555 | 0.23 | 0.16 | 0.14 | 0.23 | 0.31 | 0.43 | 0.48 | 0.45 | 0.42 | 0.34 |
| 560 | 0.23 | 0.16 | 0.14 | 0.23 | 0.31 | 0.43 | 0.49 | 0.46 | 0.43 | 0.35 |
| 565 | 0.24 | 0.17 | 0.13 | 0.22 | 0.31 | 0.44 | 0.50 | 0.47 | 0.44 | 0.35 |
| 570 | 0.24 | 0.17 | 0.14 | 0.23 | 0.32 | 0.44 | 0.51 | 0.48 | 0.45 | 0.36 |
| 575 | 0.24 | 0.17 | 0.13 | 0.22 | 0.32 | 0.45 | 0.51 | 0.49 | 0.46 | 0.37 |
| 580 | 0.24 | 0.16 | 0.13 | 0.22 | 0.32 | 0.45 | 0.52 | 0.50 | 0.47 | 0.38 |
| 585 | 0.24 | 0.16 | 0.13 | 0.22 | 0.31 | 0.45 | 0.53 | 0.51 | 0.47 | 0.39 |
| 590 | 0.24 | 0.17 | 0.13 | 0.22 | 0.32 | 0.46 | 0.54 | 0.52 | 0.48 | 0.40 |
| 595 | 0.25 | 0.17 | 0.13 | 0.22 | 0.32 | 0.46 | 0.55 | 0.53 | 0.50 | 0.41 |
| 600 | 0.25 | 0.17 | 0.13 | 0.22 | 0.32 | 0.46 | 0.55 | 0.55 | 0.51 | 0.41 |
| 605 | 0.25 | 0.17 | 0.13 | 0.22 | 0.32 | 0.47 | 0.56 | 0.56 | 0.51 | 0.42 |
| 610 | 0.25 | 0.17 | 0.13 | 0.22 | 0.32 | 0.48 | 0.57 | 0.57 | 0.53 | 0.44 |
| 615 | 0.25 | 0.17 | 0.13 | 0.21 | 0.32 | 0.48 | 0.58 | 0.58 | 0.55 | 0.45 |
| 620 | 0.26 | 0.18 | 0.13 | 0.22 | 0.32 | 0.49 | 0.59 | 0.60 | 0.56 | 0.47 |
| 625 | 0.27 | 0.18 | 0.13 | 0.21 | 0.33 | 0.49 | 0.60 | 0.61 | 0.57 | 0.48 |
| 630 | 0.27 | 0.18 | 0.13 | 0.21 | 0.33 | 0.49 | 0.61 | 0.63 | 0.59 | 0.50 |
| 635 | 0.27 | 0.18 | 0.13 | 0.21 | 0.33 | 0.50 | 0.62 | 0.64 | 0.61 | 0.52 |
| 640 | 0.28 | 0.18 | 0.13 | 0.21 | 0.33 | 0.50 | 0.62 | 0.65 | 0.62 | 0.53 |
| 645 | 0.28 | 0.18 | 0.13 | 0.21 | 0.33 | 0.50 | 0.63 | 0.67 | 0.63 | 0.55 |
| 650 | 0.29 | 0.19 | 0.14 | 0.21 | 0.33 | 0.51 | 0.63 | 0.68 | 0.65 | 0.57 |
| 655 | 0.29 | 0.19 | 0.14 | 0.21 | 0.33 | 0.51 | 0.64 | 0.69 | 0.66 | 0.59 |
| 660 | 0.29 | 0.19 | 0.13 | 0.21 | 0.32 | 0.51 | 0.65 | 0.71 | 0.68 | 0.61 |
| 665 | 0.29 | 0.19 | 0.13 | 0.21 | 0.33 | 0.52 | 0.65 | 0.72 | 0.69 | 0.63 |
| 670 | 0.29 | 0.19 | 0.13 | 0.20 | 0.32 | 0.52 | 0.66 | 0.73 | 0.70 | 0.65 |
| 675 | 0.30 | 0.19 | 0.13 | 0.20 | 0.32 | 0.52 | 0.66 | 0.74 | 0.72 | 0.67 |
| 680 | 0.30 | 0.20 | 0.13 | 0.21 | 0.32 | 0.53 | 0.67 | 0.75 | 0.73 | 0.69 |
| 685 | 0.31 | 0.20 | 0.14 | 0.20 | 0.32 | 0.53 | 0.67 | 0.77 | 0.75 | 0.71 |
| 690 | 0.31 | 0.20 | 0.13 | 0.20 | 0.32 | 0.53 | 0.67 | 0.77 | 0.76 | 0.73 |
| 695 | 0.32 | 0.21 | 0.14 | 0.20 | 0.32 | 0.53 | 0.68 | 0.79 | 0.77 | 0.75 |
| 700 | 0.32 | 0.21 | 0.14 | 0.20 | 0.32 | 0.54 | 0.69 | 0.79 | 0.79 | 0.77 |
| 705 | 0.33 | 0.21 | 0.14 | 0.20 | 0.32 | 0.53 | 0.69 | 0.80 | 0.80 | 0.79 |
| 710 | 0.33 | 0.22 | 0.14 | 0.20 | 0.32 | 0.54 | 0.69 | 0.81 | 0.82 | 0.82 |
| 715 | 0.34 | 0.22 | 0.14 | 0.20 | 0.32 | 0.54 | 0.69 | 0.82 | 0.83 | 0.83 |
| 720 | 0.34 | 0.23 | 0.14 | 0.20 | 0.32 | 0.54 | 0.70 | 0.82 | 0.84 | 0.85 |
| 725 | 0.35 | 0.23 | 0.15 | 0.19 | 0.32 | 0.54 | 0.70 | 0.83 | 0.86 | 0.88 |
| 730 | 0.35 | 0.24 | 0.15 | 0.20 | 0.32 | 0.55 | 0.71 | 0.85 | 0.88 | 0.91 |
| 735 | 0.36 | 0.24 | 0.16 | 0.20 | 0.32 | 0.55 | 0.72 | 0.86 | 0.89 | 0.93 |
| 740 | 0.36 | 0.25 | 0.16 | 0.19 | 0.32 | 0.55 | 0.71 | 0.86 | 0.90 | 0.95 |

TABLE 2-continued

| | Reflectance (%) | | | | | | | | | |
|---|---|---|---|---|---|---|---|---|---|---|
| Wavelength (nm) | Em1 | Em2 | Em3 | Em4 | Em5 | Em6 | Em7 | Em8 | Em9 | Em10 |
| 745 | 0.37 | 0.25 | 0.16 | 0.20 | 0.32 | 0.55 | 0.72 | 0.87 | 0.92 | 0.97 |
| 750 | 0.38 | 0.26 | 0.16 | 0.20 | 0.31 | 0.55 | 0.72 | 0.88 | 0.93 | 0.99 |
| 755 | 0.38 | 0.26 | 0.16 | 0.19 | 0.32 | 0.55 | 0.72 | 0.89 | 0.95 | 1.01 |
| 760 | 0.39 | 0.27 | 0.17 | 0.19 | 0.31 | 0.56 | 0.73 | 0.89 | 0.96 | 1.03 |
| 765 | 0.39 | 0.27 | 0.17 | 0.19 | 0.31 | 0.55 | 0.72 | 0.90 | 0.97 | 1.05 |
| 770 | 0.41 | 0.27 | 0.17 | 0.19 | 0.31 | 0.55 | 0.73 | 0.91 | 0.99 | 1.07 |
| 775 | 0.41 | 0.27 | 0.17 | 0.19 | 0.30 | 0.55 | 0.73 | 0.91 | 1.00 | 1.08 |
| 780 | 0.42 | 0.28 | 0.18 | 0.19 | 0.31 | 0.56 | 0.73 | 0.92 | 1.02 | 1.10 |

The definitions of the aforementioned parameters in the following embodiments are the same as that in Table 1 and Table 2 of the 1st embodiment, and are not repeated hereafter.

11th Embodiment to 20th Embodiment

Please refer to FIG. 2 to FIG. 2-10. FIG. 2 shows the values of reflectance in a wavelength range of 380 nm-780 nm of a low reflection layer according to the 11th embodiment to the 20th embodiment of the present disclosure. FIG. 2-1 shows a surface diagram of crystalline grains according to the 11th embodiment of the present disclosure. FIG. 2-2 shows a surface diagram of crystalline grains according to the 12th embodiment of the present disclosure. FIG. 2-3 shows a surface diagram of crystalline grains according to the 13th embodiment of the present disclosure. FIG. 2-4 shows a surface diagram of crystalline grains according to the 14th embodiment of the present disclosure. FIG. 2-5 shows a surface diagram of crystalline grains according to the 15th embodiment of the present disclosure. FIG. 2-6 shows a surface diagram of crystalline grains according to the 16th embodiment of the present disclosure. FIG. 2-7 shows a surface diagram of crystalline grains according to the 17th embodiment of the present disclosure. FIG. 2-8 shows a surface diagram of crystalline grains according to the 18th embodiment of the present disclosure. FIG. 2-9 shows a surface diagram of crystalline grains according to the 19th embodiment of the present disclosure. FIG. 2-10 shows a surface diagram of crystalline grains according to the 20th embodiment of the present disclosure.

In the nanocrystalline grains of the 11th embodiment to the 20th embodiment, the nanocrystalline grains are made of $Al_2O_3$. Furthermore, in FIG. 2-1 to FIG. 2-10, the size of the nanocrystalline grains is about 0.95 μm in width and 1.27 μm in length, and the total area of FIG. 2-1 to FIG. 2-10 is about 1.2 μm$^2$.

Please refer to Table 3 as follow.

TABLE 3

| | Nanocrystalline grains | | | | | | | | | |
|---|---|---|---|---|---|---|---|---|---|---|
| | Em11 | Em12 | Em13 | Em14 | Em15 | Em16 | Em17 | Em18 | Em19 | Em20 |
| | $Al_2O_3$ | | | | | | | | | |
| DC (nm) | 28 | 45 | 55 | 66 | 74 | 91 | 111 | 132 | 128 | 194 |
| R3878 | 0.28 | 0.20 | 0.17 | 0.14 | 0.19 | 0.25 | 0.36 | 0.46 | 0.48 | 0.51 |
| R3850 | 0.22 | 0.16 | 0.17 | 0.16 | 0.23 | 0.27 | 0.33 | 0.42 | 0.38 | 0.38 |
| R4070 | 0.26 | 0.18 | 0.17 | 0.14 | 0.20 | 0.26 | 0.36 | 0.46 | 0.45 | 0.47 |
| R4055 | 0.23 | 0.16 | 0.16 | 0.15 | 0.22 | 0.26 | 0.34 | 0.43 | 0.39 | 0.39 |
| R4565 | 0.25 | 0.18 | 0.16 | 0.14 | 0.19 | 0.25 | 0.36 | 0.46 | 0.44 | 0.45 |
| R5058 | 0.24 | 0.17 | 0.16 | 0.14 | 0.20 | 0.25 | 0.36 | 0.45 | 0.43 | 0.43 |
| R5570 | 0.29 | 0.20 | 0.17 | 0.13 | 0.17 | 0.25 | 0.38 | 0.49 | 0.51 | 0.55 |
| R5878 | 0.34 | 0.23 | 0.19 | 0.14 | 0.16 | 0.24 | 0.38 | 0.48 | 0.55 | 0.63 |

Table 3 shows the values of parameters of DC, R3878, R3850, R4070, R4055, R4565, R5058, R5570 and R5878 of the optical element of the miniature optical lens assembly according to the 11th embodiment to the 20th embodiment of the present disclosure, and "Em11" to "Em20" therein present the 11th embodiment to the 20th embodiment, respectively.

Please refer Table 4, Table 4 shows the values of the reflectance in a wavelength range of 380 nm-780 nm of the low reflection layer according to the 11th embodiment to the 20th embodiment.

TABLE 4

| | Reflectance (%) | | | | | | | | | |
|---|---|---|---|---|---|---|---|---|---|---|
| Wavelength (nm) | Em11 | Em12 | Em13 | Em14 | Em15 | Em16 | Em17 | Em18 | Em19 | Em20 |
| 380 | 0.19 | 0.17 | 0.17 | 0.17 | 0.25 | 0.28 | 0.33 | 0.39 | 0.36 | 0.36 |
| 385 | 0.20 | 0.17 | 0.17 | 0.17 | 0.26 | 0.27 | 0.35 | 0.40 | 0.38 | 0.39 |

TABLE 4-continued

| | Reflectance (%) | | | | | | | | | |
|---|---|---|---|---|---|---|---|---|---|---|
| Wavelength (nm) | Em11 | Em12 | Em13 | Em14 | Em15 | Em16 | Em17 | Em18 | Em19 | Em20 |
| 390 | 0.19 | 0.15 | 0.14 | 0.15 | 0.24 | 0.26 | 0.32 | 0.39 | 0.37 | 0.38 |
| 395 | 0.22 | 0.17 | 0.18 | 0.17 | 0.25 | 0.29 | 0.35 | 0.42 | 0.41 | 0.39 |
| 400 | 0.22 | 0.16 | 0.17 | 0.16 | 0.24 | 0.29 | 0.34 | 0.41 | 0.40 | 0.38 |
| 405 | 0.23 | 0.17 | 0.19 | 0.17 | 0.26 | 0.28 | 0.35 | 0.43 | 0.42 | 0.39 |
| 410 | 0.22 | 0.16 | 0.17 | 0.16 | 0.25 | 0.28 | 0.34 | 0.42 | 0.40 | 0.39 |
| 415 | 0.22 | 0.16 | 0.17 | 0.16 | 0.25 | 0.28 | 0.33 | 0.42 | 0.40 | 0.39 |
| 420 | 0.22 | 0.16 | 0.17 | 0.16 | 0.24 | 0.28 | 0.34 | 0.43 | 0.39 | 0.38 |
| 425 | 0.22 | 0.16 | 0.17 | 0.17 | 0.24 | 0.27 | 0.33 | 0.41 | 0.38 | 0.37 |
| 430 | 0.22 | 0.16 | 0.17 | 0.16 | 0.24 | 0.27 | 0.33 | 0.42 | 0.38 | 0.37 |
| 435 | 0.21 | 0.16 | 0.17 | 0.15 | 0.23 | 0.27 | 0.33 | 0.42 | 0.38 | 0.37 |
| 440 | 0.22 | 0.16 | 0.17 | 0.15 | 0.23 | 0.27 | 0.33 | 0.42 | 0.37 | 0.37 |
| 445 | 0.22 | 0.16 | 0.16 | 0.15 | 0.23 | 0.27 | 0.32 | 0.42 | 0.37 | 0.37 |
| 450 | 0.22 | 0.16 | 0.16 | 0.15 | 0.23 | 0.26 | 0.33 | 0.42 | 0.37 | 0.37 |
| 455 | 0.22 | 0.16 | 0.16 | 0.15 | 0.23 | 0.26 | 0.33 | 0.42 | 0.38 | 0.38 |
| 460 | 0.22 | 0.16 | 0.16 | 0.15 | 0.22 | 0.26 | 0.33 | 0.42 | 0.38 | 0.37 |
| 465 | 0.22 | 0.16 | 0.16 | 0.15 | 0.22 | 0.26 | 0.33 | 0.42 | 0.38 | 0.38 |
| 470 | 0.22 | 0.16 | 0.16 | 0.15 | 0.22 | 0.26 | 0.33 | 0.42 | 0.38 | 0.37 |
| 475 | 0.23 | 0.16 | 0.16 | 0.15 | 0.22 | 0.26 | 0.33 | 0.42 | 0.38 | 0.37 |
| 480 | 0.23 | 0.16 | 0.16 | 0.15 | 0.22 | 0.26 | 0.33 | 0.42 | 0.38 | 0.38 |
| 485 | 0.23 | 0.16 | 0.16 | 0.15 | 0.22 | 0.25 | 0.33 | 0.43 | 0.38 | 0.38 |
| 490 | 0.23 | 0.16 | 0.16 | 0.15 | 0.21 | 0.25 | 0.33 | 0.43 | 0.38 | 0.38 |
| 495 | 0.23 | 0.16 | 0.16 | 0.14 | 0.21 | 0.25 | 0.34 | 0.43 | 0.38 | 0.39 |
| 500 | 0.23 | 0.17 | 0.16 | 0.14 | 0.21 | 0.25 | 0.34 | 0.43 | 0.39 | 0.39 |
| 505 | 0.23 | 0.17 | 0.16 | 0.14 | 0.21 | 0.25 | 0.34 | 0.43 | 0.39 | 0.39 |
| 510 | 0.23 | 0.17 | 0.16 | 0.14 | 0.21 | 0.25 | 0.35 | 0.44 | 0.40 | 0.39 |
| 515 | 0.23 | 0.17 | 0.16 | 0.14 | 0.21 | 0.25 | 0.35 | 0.44 | 0.40 | 0.40 |
| 520 | 0.23 | 0.17 | 0.16 | 0.15 | 0.21 | 0.25 | 0.35 | 0.45 | 0.41 | 0.40 |
| 525 | 0.24 | 0.17 | 0.16 | 0.14 | 0.20 | 0.25 | 0.35 | 0.45 | 0.41 | 0.41 |
| 530 | 0.24 | 0.17 | 0.16 | 0.14 | 0.20 | 0.25 | 0.36 | 0.45 | 0.41 | 0.41 |
| 535 | 0.24 | 0.17 | 0.16 | 0.14 | 0.20 | 0.25 | 0.36 | 0.45 | 0.42 | 0.42 |
| 540 | 0.24 | 0.17 | 0.16 | 0.14 | 0.20 | 0.25 | 0.36 | 0.45 | 0.42 | 0.42 |
| 545 | 0.24 | 0.17 | 0.16 | 0.14 | 0.19 | 0.25 | 0.36 | 0.45 | 0.42 | 0.43 |
| 550 | 0.24 | 0.17 | 0.16 | 0.14 | 0.19 | 0.25 | 0.37 | 0.46 | 0.43 | 0.44 |
| 555 | 0.25 | 0.18 | 0.16 | 0.14 | 0.19 | 0.25 | 0.37 | 0.46 | 0.44 | 0.44 |
| 560 | 0.25 | 0.18 | 0.16 | 0.14 | 0.19 | 0.25 | 0.37 | 0.47 | 0.45 | 0.45 |
| 565 | 0.25 | 0.18 | 0.16 | 0.14 | 0.19 | 0.25 | 0.37 | 0.47 | 0.45 | 0.46 |
| 570 | 0.25 | 0.18 | 0.16 | 0.14 | 0.19 | 0.25 | 0.37 | 0.47 | 0.46 | 0.47 |
| 575 | 0.26 | 0.18 | 0.16 | 0.14 | 0.19 | 0.25 | 0.38 | 0.47 | 0.47 | 0.47 |
| 580 | 0.26 | 0.18 | 0.16 | 0.14 | 0.19 | 0.25 | 0.38 | 0.48 | 0.47 | 0.48 |
| 585 | 0.26 | 0.18 | 0.16 | 0.14 | 0.18 | 0.25 | 0.38 | 0.48 | 0.48 | 0.48 |
| 590 | 0.26 | 0.18 | 0.16 | 0.14 | 0.18 | 0.25 | 0.38 | 0.48 | 0.49 | 0.49 |
| 595 | 0.26 | 0.18 | 0.16 | 0.13 | 0.18 | 0.25 | 0.38 | 0.48 | 0.49 | 0.50 |
| 600 | 0.27 | 0.19 | 0.16 | 0.13 | 0.18 | 0.25 | 0.38 | 0.48 | 0.49 | 0.50 |
| 605 | 0.27 | 0.19 | 0.16 | 0.13 | 0.17 | 0.25 | 0.38 | 0.48 | 0.49 | 0.51 |
| 610 | 0.27 | 0.19 | 0.16 | 0.13 | 0.17 | 0.26 | 0.38 | 0.49 | 0.50 | 0.52 |
| 615 | 0.27 | 0.19 | 0.16 | 0.13 | 0.17 | 0.25 | 0.38 | 0.49 | 0.51 | 0.53 |
| 620 | 0.28 | 0.19 | 0.16 | 0.13 | 0.17 | 0.26 | 0.38 | 0.49 | 0.51 | 0.54 |
| 625 | 0.28 | 0.20 | 0.17 | 0.13 | 0.17 | 0.26 | 0.38 | 0.49 | 0.52 | 0.55 |
| 630 | 0.29 | 0.20 | 0.17 | 0.13 | 0.17 | 0.26 | 0.39 | 0.50 | 0.53 | 0.56 |
| 635 | 0.29 | 0.20 | 0.17 | 0.13 | 0.17 | 0.25 | 0.39 | 0.50 | 0.53 | 0.57 |
| 640 | 0.29 | 0.20 | 0.17 | 0.13 | 0.17 | 0.25 | 0.39 | 0.50 | 0.54 | 0.58 |
| 645 | 0.30 | 0.20 | 0.17 | 0.13 | 0.17 | 0.25 | 0.39 | 0.50 | 0.54 | 0.58 |
| 650 | 0.30 | 0.21 | 0.17 | 0.13 | 0.17 | 0.25 | 0.39 | 0.50 | 0.54 | 0.59 |
| 655 | 0.31 | 0.21 | 0.17 | 0.13 | 0.17 | 0.25 | 0.39 | 0.50 | 0.54 | 0.60 |
| 660 | 0.31 | 0.21 | 0.17 | 0.13 | 0.17 | 0.25 | 0.39 | 0.50 | 0.55 | 0.61 |
| 665 | 0.31 | 0.22 | 0.17 | 0.13 | 0.16 | 0.25 | 0.39 | 0.50 | 0.55 | 0.61 |
| 670 | 0.32 | 0.22 | 0.18 | 0.13 | 0.16 | 0.25 | 0.39 | 0.50 | 0.56 | 0.62 |
| 675 | 0.32 | 0.22 | 0.18 | 0.13 | 0.16 | 0.25 | 0.39 | 0.50 | 0.56 | 0.63 |
| 680 | 0.33 | 0.22 | 0.18 | 0.13 | 0.16 | 0.24 | 0.38 | 0.49 | 0.56 | 0.63 |
| 685 | 0.33 | 0.23 | 0.18 | 0.13 | 0.16 | 0.24 | 0.38 | 0.49 | 0.57 | 0.64 |
| 690 | 0.33 | 0.23 | 0.18 | 0.13 | 0.16 | 0.24 | 0.38 | 0.49 | 0.56 | 0.65 |
| 695 | 0.34 | 0.23 | 0.18 | 0.13 | 0.15 | 0.24 | 0.38 | 0.49 | 0.57 | 0.66 |
| 700 | 0.34 | 0.24 | 0.18 | 0.13 | 0.16 | 0.24 | 0.38 | 0.49 | 0.57 | 0.66 |
| 705 | 0.36 | 0.25 | 0.19 | 0.14 | 0.16 | 0.24 | 0.38 | 0.49 | 0.58 | 0.67 |
| 710 | 0.36 | 0.25 | 0.19 | 0.13 | 0.15 | 0.24 | 0.38 | 0.48 | 0.58 | 0.68 |
| 715 | 0.36 | 0.25 | 0.19 | 0.14 | 0.16 | 0.24 | 0.38 | 0.48 | 0.58 | 0.68 |
| 720 | 0.37 | 0.26 | 0.19 | 0.14 | 0.16 | 0.23 | 0.38 | 0.47 | 0.58 | 0.69 |
| 725 | 0.37 | 0.26 | 0.20 | 0.14 | 0.16 | 0.24 | 0.38 | 0.47 | 0.58 | 0.70 |
| 730 | 0.39 | 0.27 | 0.20 | 0.14 | 0.16 | 0.24 | 0.39 | 0.47 | 0.59 | 0.71 |
| 735 | 0.39 | 0.27 | 0.20 | 0.14 | 0.16 | 0.23 | 0.38 | 0.47 | 0.59 | 0.71 |
| 740 | 0.40 | 0.28 | 0.21 | 0.15 | 0.16 | 0.23 | 0.38 | 0.47 | 0.59 | 0.72 |
| 745 | 0.40 | 0.28 | 0.21 | 0.15 | 0.16 | 0.23 | 0.38 | 0.47 | 0.59 | 0.72 |
| 750 | 0.41 | 0.29 | 0.21 | 0.15 | 0.16 | 0.23 | 0.38 | 0.47 | 0.59 | 0.73 |
| 755 | 0.41 | 0.29 | 0.22 | 0.15 | 0.16 | 0.23 | 0.38 | 0.47 | 0.59 | 0.73 |
| 760 | 0.42 | 0.30 | 0.22 | 0.15 | 0.16 | 0.23 | 0.38 | 0.47 | 0.60 | 0.73 |
| 765 | 0.43 | 0.30 | 0.23 | 0.16 | 0.16 | 0.22 | 0.37 | 0.46 | 0.59 | 0.74 |

TABLE 4-continued

| | Reflectance (%) | | | | | | | | | |
|---|---|---|---|---|---|---|---|---|---|---|
| Wavelength (nm) | Em11 | Em12 | Em13 | Em14 | Em15 | Em16 | Em17 | Em18 | Em19 | Em20 |
| 770 | 0.44 | 0.31 | 0.23 | 0.16 | 0.16 | 0.23 | 0.37 | 0.46 | 0.60 | 0.74 |
| 775 | 0.44 | 0.31 | 0.23 | 0.16 | 0.16 | 0.22 | 0.37 | 0.45 | 0.60 | 0.74 |
| 780 | 0.44 | 0.31 | 0.23 | 0.16 | 0.16 | 0.22 | 0.37 | 0.45 | 0.60 | 0.74 |

21 st Embodiment to 30th Embodiment

Please refer to FIG. 3 to FIG. 3-10. FIG. 3 shows the values of reflectance in a wavelength range of 380 nm-780 nm of a low reflection layer according to the 21st embodiment to the 30th embodiment of the present disclosure. FIG. 3-1 shows a surface diagram of crystalline grains according to the 21st embodiment of the present disclosure. FIG. 3-2 shows a surface diagram of crystalline grains according to the 22nd embodiment of the present disclosure. FIG. 3-3 shows a surface diagram of crystalline grains according to the 23rd embodiment of the present disclosure. FIG. 3-4 shows a surface diagram of crystalline grains according to the 24th embodiment of the present disclosure. FIG. 3-5 shows a surface diagram of crystalline grains according to the 25th embodiment of the present disclosure. FIG. 3-6 shows a surface diagram of crystalline grains according to the 26th embodiment of the present disclosure. FIG. 3-7 shows a surface diagram of crystalline grains according to the 27th embodiment of the present disclosure. FIG. 3-8 shows a surface diagram of crystalline grains according to the 28th embodiment of the present disclosure. FIG. 3-9 shows a surface diagram of crystalline grains according to the 29th embodiment of the present disclosure. FIG. 3-10 shows a surface diagram of crystalline grains according to the 30th embodiment of the present disclosure.

In the nanocrystalline grains of the 21st embodiment to the 30th embodiment, the nanocrystalline grains are made of $TiO_2$. Furthermore, in FIG. 3-1 to FIG. 3-10, the size of the nanocrystalline grains is about 0.95 μm in width and 1.27 μm in length, and the total area of FIG. 3-1 to FIG. 3-10 is about 1.2 μm².

Please refer to Table 5 as follow.

TABLE 5

| | Nanocrystalline grains | | | | | | | | | |
|---|---|---|---|---|---|---|---|---|---|---|
| | Em21 | Em22 | Em23 | Em24 | Em25 | Em26 | Em27 | Em28 | Em29 | Em30 |
| | | | | | $TiO_2$ | | | | | |
| DC (nm) | 25 | 31 | 39 | 55 | 63 | 73 | 92 | 115 | 146 | 189 |
| R3878 | 0.28 | 0.27 | 0.26 | 0.30 | 0.29 | 0.44 | 0.61 | 0.87 | 1.08 | 1.19 |
| R3850 | 0.24 | 0.25 | 0.26 | 0.30 | 0.38 | 0.57 | 0.64 | 0.77 | 1.14 | 1.43 |
| R4070 | 0.26 | 0.25 | 0.24 | 0.28 | 0.29 | 0.46 | 0.63 | 0.82 | 0.97 | 1.19 |
| R4055 | 0.24 | 0.24 | 0.24 | 0.28 | 0.33 | 0.53 | 0.64 | 0.72 | 1.02 | 1.31 |
| R4565 | 0.25 | 0.24 | 0.23 | 0.27 | 0.28 | 0.46 | 0.64 | 0.77 | 0.89 | 1.16 |
| R5058 | 0.24 | 0.23 | 0.23 | 0.27 | 0.28 | 0.47 | 0.64 | 0.73 | 0.85 | 1.19 |
| R5570 | 0.28 | 0.26 | 0.25 | 0.28 | 0.24 | 0.39 | 0.63 | 0.91 | 0.92 | 1.06 |
| R5878 | 0.32 | 0.29 | 0.28 | 0.32 | 0.24 | 0.35 | 0.58 | 0.99 | 1.12 | 1.05 |

Table 3 shows the values of parameters of DC, R3878, R3850, R4070, R4055, R4565, R5058, R5570 and R5878 of the optical element of the miniature optical lens assembly according to the 21st embodiment to the 30th embodiment of the present disclosure, and "Em21" to "Em30" therein present the 11th embodiment to the 20th embodiment, respectively.

Please refer Table 6, Table 6 shows the values of the reflectance in a wavelength range of 380 nm-780 nm of the low reflection layer according to the 21st embodiment to the 30th embodiment.

TABLE 6

| | Reflectance (%) | | | | | | | | | |
|---|---|---|---|---|---|---|---|---|---|---|
| Wavelength (nm) | Em21 | Em22 | Em23 | Em24 | Em25 | Em26 | Em27 | Em28 | Em29 | Em30 |
| 380 | 0.28 | 0.28 | 0.31 | 0.37 | 0.48 | 0.65 | 0.65 | 1.02 | 1.39 | 1.79 |
| 385 | 0.25 | 0.30 | 0.30 | 0.32 | 0.47 | 0.64 | 0.66 | 0.96 | 1.34 | 1.76 |
| 390 | 0.23 | 0.26 | 0.26 | 0.34 | 0.47 | 0.65 | 0.66 | 0.97 | 1.36 | 1.79 |
| 395 | 0.27 | 0.28 | 0.28 | 0.37 | 0.47 | 0.67 | 0.69 | 0.98 | 1.37 | 1.80 |
| 400 | 0.25 | 0.27 | 0.27 | 0.34 | 0.45 | 0.65 | 0.68 | 0.94 | 1.34 | 1.76 |
| 405 | 0.25 | 0.27 | 0.29 | 0.34 | 0.45 | 0.64 | 0.68 | 0.91 | 1.30 | 1.69 |
| 410 | 0.25 | 0.27 | 0.28 | 0.32 | 0.43 | 0.62 | 0.65 | 0.86 | 1.26 | 1.62 |
| 415 | 0.25 | 0.27 | 0.27 | 0.32 | 0.41 | 0.61 | 0.64 | 0.83 | 1.23 | 1.56 |

TABLE 6-continued

| | Reflectance (%) | | | | | | | | | |
|---|---|---|---|---|---|---|---|---|---|---|
| Wavelength (nm) | Em21 | Em22 | Em23 | Em24 | Em25 | Em26 | Em27 | Em28 | Em29 | Em30 |
| 420 | 0.24 | 0.26 | 0.27 | 0.31 | 0.40 | 0.60 | 0.63 | 0.80 | 1.20 | 1.50 |
| 425 | 0.24 | 0.25 | 0.26 | 0.30 | 0.38 | 0.58 | 0.63 | 0.77 | 1.17 | 1.44 |
| 430 | 0.24 | 0.25 | 0.25 | 0.29 | 0.37 | 0.57 | 0.63 | 0.75 | 1.15 | 1.41 |
| 435 | 0.24 | 0.25 | 0.25 | 0.29 | 0.36 | 0.57 | 0.62 | 0.72 | 1.13 | 1.37 |
| 440 | 0.23 | 0.25 | 0.25 | 0.29 | 0.36 | 0.56 | 0.62 | 0.71 | 1.12 | 1.34 |
| 445 | 0.24 | 0.24 | 0.24 | 0.28 | 0.35 | 0.55 | 0.62 | 0.70 | 1.10 | 1.32 |
| 450 | 0.23 | 0.24 | 0.24 | 0.28 | 0.34 | 0.55 | 0.62 | 0.68 | 1.08 | 1.29 |
| 455 | 0.24 | 0.24 | 0.24 | 0.28 | 0.34 | 0.54 | 0.63 | 0.68 | 1.07 | 1.28 |
| 460 | 0.23 | 0.24 | 0.24 | 0.28 | 0.33 | 0.54 | 0.62 | 0.67 | 1.04 | 1.26 |
| 465 | 0.23 | 0.24 | 0.24 | 0.27 | 0.33 | 0.53 | 0.63 | 0.66 | 1.02 | 1.24 |
| 470 | 0.23 | 0.24 | 0.24 | 0.28 | 0.33 | 0.53 | 0.62 | 0.66 | 1.01 | 1.23 |
| 475 | 0.23 | 0.24 | 0.24 | 0.27 | 0.32 | 0.53 | 0.62 | 0.66 | 0.99 | 1.23 |
| 480 | 0.23 | 0.23 | 0.24 | 0.27 | 0.32 | 0.53 | 0.63 | 0.66 | 0.98 | 1.23 |
| 485 | 0.23 | 0.23 | 0.24 | 0.27 | 0.31 | 0.52 | 0.63 | 0.66 | 0.97 | 1.22 |
| 490 | 0.23 | 0.23 | 0.23 | 0.27 | 0.31 | 0.51 | 0.62 | 0.66 | 0.95 | 1.21 |
| 495 | 0.23 | 0.23 | 0.23 | 0.27 | 0.31 | 0.51 | 0.63 | 0.66 | 0.94 | 1.21 |
| 500 | 0.23 | 0.23 | 0.23 | 0.27 | 0.30 | 0.51 | 0.63 | 0.67 | 0.93 | 1.21 |
| 505 | 0.23 | 0.23 | 0.23 | 0.27 | 0.30 | 0.50 | 0.63 | 0.67 | 0.91 | 1.21 |
| 510 | 0.24 | 0.23 | 0.23 | 0.27 | 0.30 | 0.50 | 0.64 | 0.68 | 0.91 | 1.21 |
| 515 | 0.24 | 0.23 | 0.23 | 0.27 | 0.29 | 0.50 | 0.64 | 0.69 | 0.89 | 1.21 |
| 520 | 0.24 | 0.23 | 0.23 | 0.27 | 0.29 | 0.49 | 0.64 | 0.69 | 0.88 | 1.21 |
| 525 | 0.24 | 0.23 | 0.23 | 0.27 | 0.28 | 0.49 | 0.65 | 0.70 | 0.87 | 1.21 |
| 530 | 0.24 | 0.24 | 0.23 | 0.27 | 0.28 | 0.48 | 0.65 | 0.71 | 0.86 | 1.21 |
| 535 | 0.24 | 0.23 | 0.22 | 0.26 | 0.28 | 0.48 | 0.65 | 0.71 | 0.85 | 1.20 |
| 540 | 0.24 | 0.23 | 0.22 | 0.26 | 0.28 | 0.47 | 0.65 | 0.72 | 0.85 | 1.20 |
| 545 | 0.24 | 0.23 | 0.22 | 0.26 | 0.27 | 0.46 | 0.65 | 0.73 | 0.84 | 1.19 |
| 550 | 0.24 | 0.23 | 0.22 | 0.26 | 0.27 | 0.46 | 0.65 | 0.74 | 0.83 | 1.19 |
| 555 | 0.24 | 0.23 | 0.22 | 0.27 | 0.27 | 0.46 | 0.65 | 0.75 | 0.82 | 1.19 |
| 560 | 0.25 | 0.24 | 0.23 | 0.27 | 0.27 | 0.45 | 0.65 | 0.77 | 0.82 | 1.18 |
| 565 | 0.25 | 0.24 | 0.23 | 0.27 | 0.27 | 0.45 | 0.65 | 0.78 | 0.82 | 1.17 |
| 570 | 0.25 | 0.24 | 0.23 | 0.27 | 0.26 | 0.44 | 0.65 | 0.79 | 0.81 | 1.17 |
| 575 | 0.25 | 0.24 | 0.23 | 0.27 | 0.26 | 0.44 | 0.65 | 0.80 | 0.81 | 1.16 |
| 580 | 0.25 | 0.24 | 0.23 | 0.27 | 0.26 | 0.43 | 0.65 | 0.82 | 0.81 | 1.15 |
| 585 | 0.25 | 0.24 | 0.23 | 0.27 | 0.25 | 0.43 | 0.64 | 0.83 | 0.81 | 1.13 |
| 590 | 0.26 | 0.25 | 0.23 | 0.27 | 0.25 | 0.42 | 0.65 | 0.84 | 0.81 | 1.12 |
| 595 | 0.26 | 0.25 | 0.23 | 0.27 | 0.25 | 0.42 | 0.64 | 0.85 | 0.82 | 1.11 |
| 600 | 0.26 | 0.25 | 0.23 | 0.27 | 0.25 | 0.41 | 0.64 | 0.86 | 0.82 | 1.10 |
| 605 | 0.26 | 0.25 | 0.23 | 0.27 | 0.24 | 0.41 | 0.64 | 0.87 | 0.82 | 1.08 |
| 610 | 0.27 | 0.25 | 0.23 | 0.27 | 0.24 | 0.40 | 0.64 | 0.88 | 0.83 | 1.07 |
| 615 | 0.27 | 0.26 | 0.23 | 0.28 | 0.24 | 0.40 | 0.64 | 0.90 | 0.84 | 1.07 |
| 620 | 0.27 | 0.26 | 0.24 | 0.28 | 0.24 | 0.40 | 0.64 | 0.91 | 0.86 | 1.06 |
| 625 | 0.28 | 0.26 | 0.24 | 0.28 | 0.24 | 0.39 | 0.64 | 0.92 | 0.87 | 1.05 |
| 630 | 0.28 | 0.27 | 0.24 | 0.28 | 0.24 | 0.39 | 0.64 | 0.93 | 0.89 | 1.04 |
| 635 | 0.28 | 0.27 | 0.24 | 0.28 | 0.24 | 0.38 | 0.63 | 0.94 | 0.91 | 1.03 |
| 640 | 0.29 | 0.27 | 0.25 | 0.29 | 0.24 | 0.38 | 0.63 | 0.95 | 0.92 | 1.02 |
| 645 | 0.29 | 0.27 | 0.25 | 0.29 | 0.24 | 0.37 | 0.63 | 0.96 | 0.94 | 1.01 |
| 650 | 0.29 | 0.27 | 0.25 | 0.29 | 0.24 | 0.37 | 0.62 | 0.97 | 0.96 | 1.00 |
| 655 | 0.29 | 0.27 | 0.25 | 0.29 | 0.24 | 0.36 | 0.62 | 0.98 | 0.98 | 0.99 |
| 660 | 0.30 | 0.27 | 0.26 | 0.29 | 0.23 | 0.36 | 0.61 | 0.98 | 1.00 | 0.99 |
| 665 | 0.30 | 0.28 | 0.26 | 0.30 | 0.23 | 0.35 | 0.61 | 0.99 | 1.02 | 0.98 |
| 670 | 0.30 | 0.28 | 0.26 | 0.30 | 0.23 | 0.35 | 0.60 | 1.00 | 1.04 | 0.98 |
| 675 | 0.31 | 0.28 | 0.27 | 0.30 | 0.23 | 0.35 | 0.60 | 1.01 | 1.06 | 0.97 |
| 680 | 0.31 | 0.29 | 0.27 | 0.30 | 0.23 | 0.34 | 0.59 | 1.01 | 1.08 | 0.97 |
| 685 | 0.31 | 0.29 | 0.27 | 0.31 | 0.23 | 0.34 | 0.59 | 1.02 | 1.10 | 0.97 |
| 690 | 0.31 | 0.29 | 0.28 | 0.31 | 0.23 | 0.33 | 0.58 | 1.03 | 1.12 | 0.97 |
| 695 | 0.32 | 0.30 | 0.28 | 0.31 | 0.23 | 0.33 | 0.57 | 1.03 | 1.15 | 0.97 |
| 700 | 0.32 | 0.30 | 0.28 | 0.32 | 0.23 | 0.32 | 0.57 | 1.04 | 1.17 | 0.97 |
| 705 | 0.33 | 0.30 | 0.29 | 0.32 | 0.23 | 0.32 | 0.56 | 1.04 | 1.20 | 0.98 |
| 710 | 0.33 | 0.30 | 0.29 | 0.33 | 0.24 | 0.32 | 0.56 | 1.05 | 1.22 | 0.98 |
| 715 | 0.34 | 0.31 | 0.30 | 0.33 | 0.24 | 0.31 | 0.55 | 1.04 | 1.25 | 0.99 |
| 720 | 0.34 | 0.31 | 0.30 | 0.33 | 0.24 | 0.31 | 0.54 | 1.04 | 1.27 | 0.99 |
| 725 | 0.35 | 0.32 | 0.30 | 0.34 | 0.24 | 0.31 | 0.54 | 1.05 | 1.30 | 1.01 |
| 730 | 0.35 | 0.32 | 0.30 | 0.35 | 0.25 | 0.31 | 0.54 | 1.06 | 1.33 | 1.03 |
| 735 | 0.36 | 0.33 | 0.31 | 0.36 | 0.25 | 0.30 | 0.53 | 1.06 | 1.36 | 1.04 |
| 740 | 0.37 | 0.33 | 0.32 | 0.36 | 0.25 | 0.30 | 0.53 | 1.06 | 1.39 | 1.06 |
| 745 | 0.37 | 0.33 | 0.32 | 0.37 | 0.25 | 0.30 | 0.52 | 1.07 | 1.41 | 1.07 |
| 750 | 0.38 | 0.34 | 0.33 | 0.37 | 0.26 | 0.30 | 0.52 | 1.07 | 1.44 | 1.09 |
| 755 | 0.39 | 0.34 | 0.33 | 0.38 | 0.25 | 0.30 | 0.51 | 1.08 | 1.47 | 1.11 |
| 760 | 0.39 | 0.35 | 0.34 | 0.38 | 0.26 | 0.30 | 0.51 | 1.08 | 1.50 | 1.13 |
| 765 | 0.40 | 0.35 | 0.34 | 0.39 | 0.26 | 0.29 | 0.51 | 1.08 | 1.52 | 1.14 |
| 770 | 0.41 | 0.36 | 0.35 | 0.39 | 0.26 | 0.29 | 0.50 | 1.08 | 1.55 | 1.16 |
| 775 | 0.41 | 0.36 | 0.36 | 0.40 | 0.27 | 0.29 | 0.49 | 1.09 | 1.57 | 1.18 |
| 780 | 0.42 | 0.36 | 0.36 | 0.40 | 0.27 | 0.29 | 0.49 | 1.09 | 1.60 | 1.21 |

Figure 11:
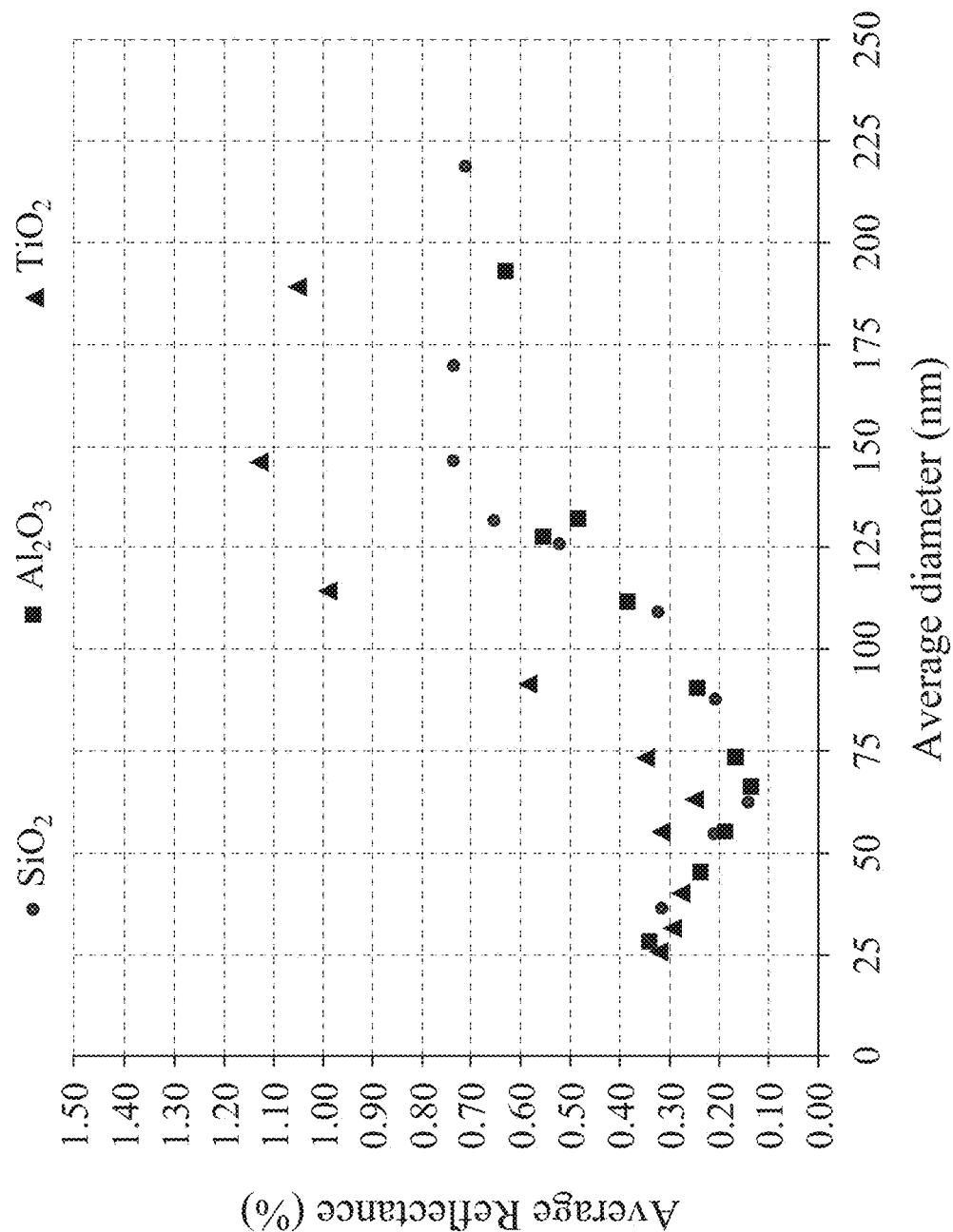
FIG. 11 is a relationship diagram between the values of R5878 and an average diameter of the nanocrystalline grains according to the 1st embodiment to the 30th embodiment of the present disclosure.

Please refer to FIG. 4 to FIG. 11. FIG. 4 is a relationship diagram between the values of R3878 and the average diameter of the nanocrystalline grains according to the 1st embodiment to the 30th embodiment of the present disclosure. FIG. 5 is a relationship diagram between the values of R3850 and the average diameter of the nanocrystalline grains according to the 1st embodiment to the 30th embodiment of the present disclosure. FIG. 6 is a relationship diagram between the values of R4070 and the average diameter of the nanocrystalline grains according to the 1st embodiment to the 30th embodiment of the present disclosure. FIG. 7 is a relationship diagram between the values of R4055 and the average diameter of the nanocrystalline grains according to the 1st embodiment to the 30th embodiment of the present disclosure. FIG. 8 is a relationship diagram between the values of R4565 and the average diameter of the nanocrystalline grains according to the 1st embodiment to the 30th embodiment of the present disclosure. FIG. 9 is a relationship diagram between the values of R5058 and the average diameter of the nanocrystalline grains according to the 1st embodiment to the 30th embodiment of the present disclosure. FIG. 10 is a relationship diagram between the values of R5570 and the average diameter of the nanocrystalline grains according to the 1st embodiment to the 30th embodiment of the present disclosure. FIG. 11 is a relationship diagram between the values of R5878 and the average diameter of the nanocrystalline grains according to the 1st embodiment to the 30th embodiment of the present disclosure.

FIG. 4 to FIG. 11 are respectively the relationship diagrams between R3878, R3850, R4070, R4055, R4565, R5058, R5570, R5878 and DC, wherein the detail values of parameters of R3878, R3850, R4070, R4055, R4565, R5058, R5570, R5878 and DC according to the 1st embodiment to the 30th embodiment are shown in Table 1, Table 3 and Table 5 and are not repeated hereafter. Furthermore, the reflectance described in the present disclosure is measured by the power ratio of the reflected wave to the incident wave based on the vertical (0 degree) incident/reflecting surface.

31st Embodiment

Figure 12:
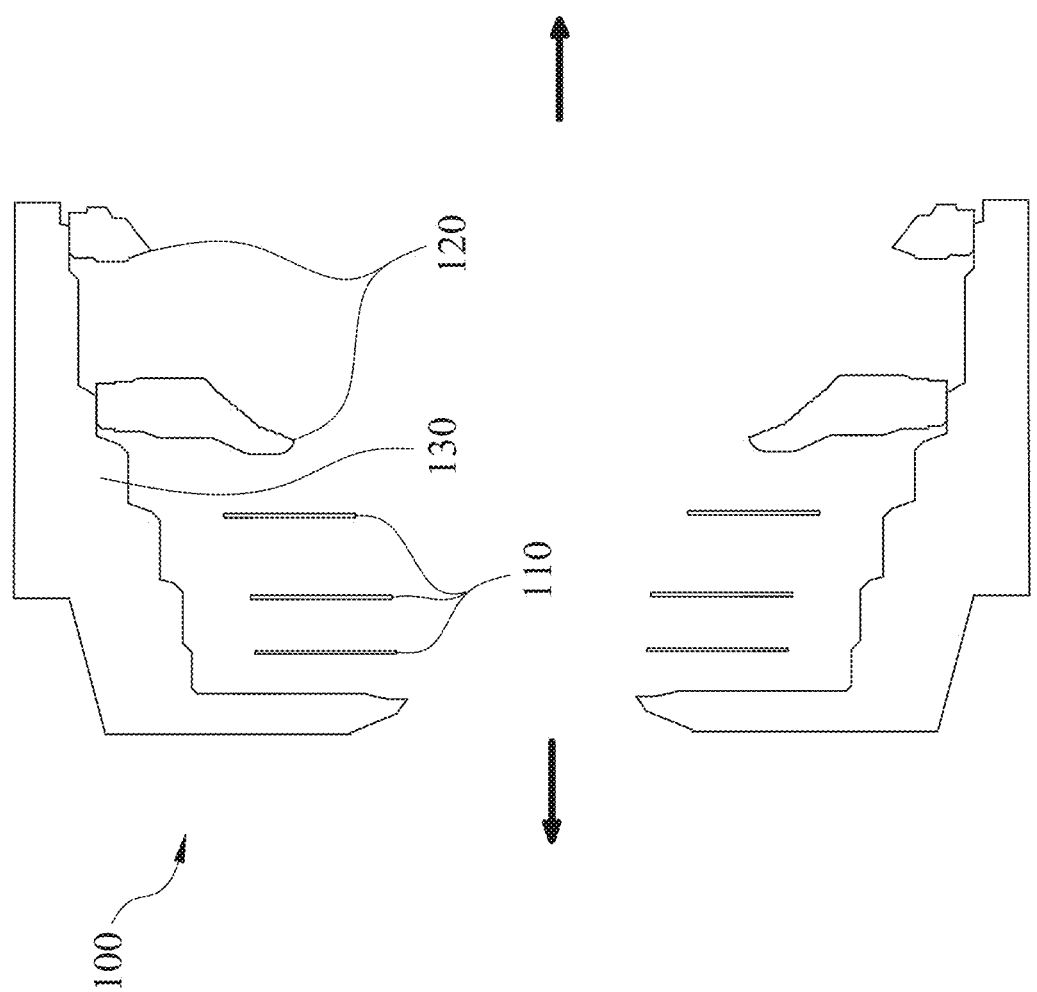
FIG. 12 is a cross-sectional view of a miniature optical lens assembly according to the 31st embodiment of the present disclosure.

FIG. 12 is a cross-sectional view of a miniature optical lens assembly 100 according to the 31st embodiment of the present disclosure. The miniature optical lens assembly 100 includes at least one of optical element (reference number is omitted). The optical element includes a low reflection layer (reference number is omitted) disposed on at least one surface of the optical element. The low reflection layer includes a plurality of nanocrystalline grains, and the nanocrystalline grains are located on a surface of the low reflection layer.

In detail, in the 31st embodiment, the miniature optical lens assembly 100 includes three light blocking elements 110, two annular spacer elements 120 and a barrel element 130, the low reflection layer is disposed on at least one surface of the light blocking elements 110, the annular spacer elements 120 and the barrel element 130, and the nanocrystalline grains of the low reflection layer can be the nanocrystalline grains of the 1st embodiment to the 30th embodiment according to actual needs. Therefore, the intensity of stray light being incident on the low reflection layer can be further destroyed and suppressed by the nanocrystalline grains with proper particle sizes. Furthermore, a gradual distribution of the refractive index between the surface of the optical element and the air can be achieved by the nanocrystalline grains made of a material with a proper refractive index, so that it is favorable for maintaining the ultra-low reflectance of the surface of the optical element and enhancing the optical image quality of the miniature optical lens assembly 100.

32nd Embodiment

Figure 13A:
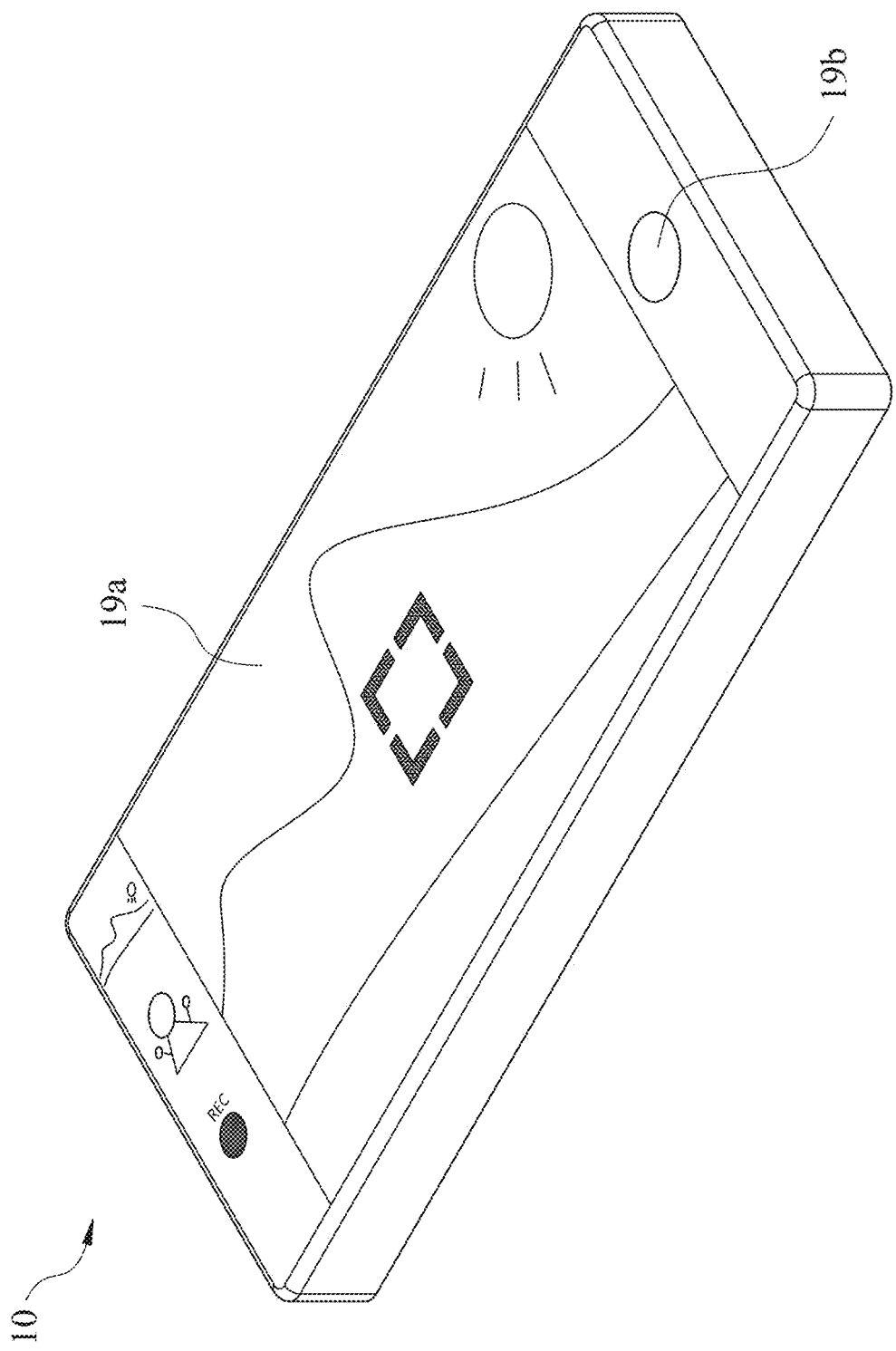
FIG. 13A is a schematic view of an electronic device according to the 32nd embodiment of the present disclosure.
Figure 13B:
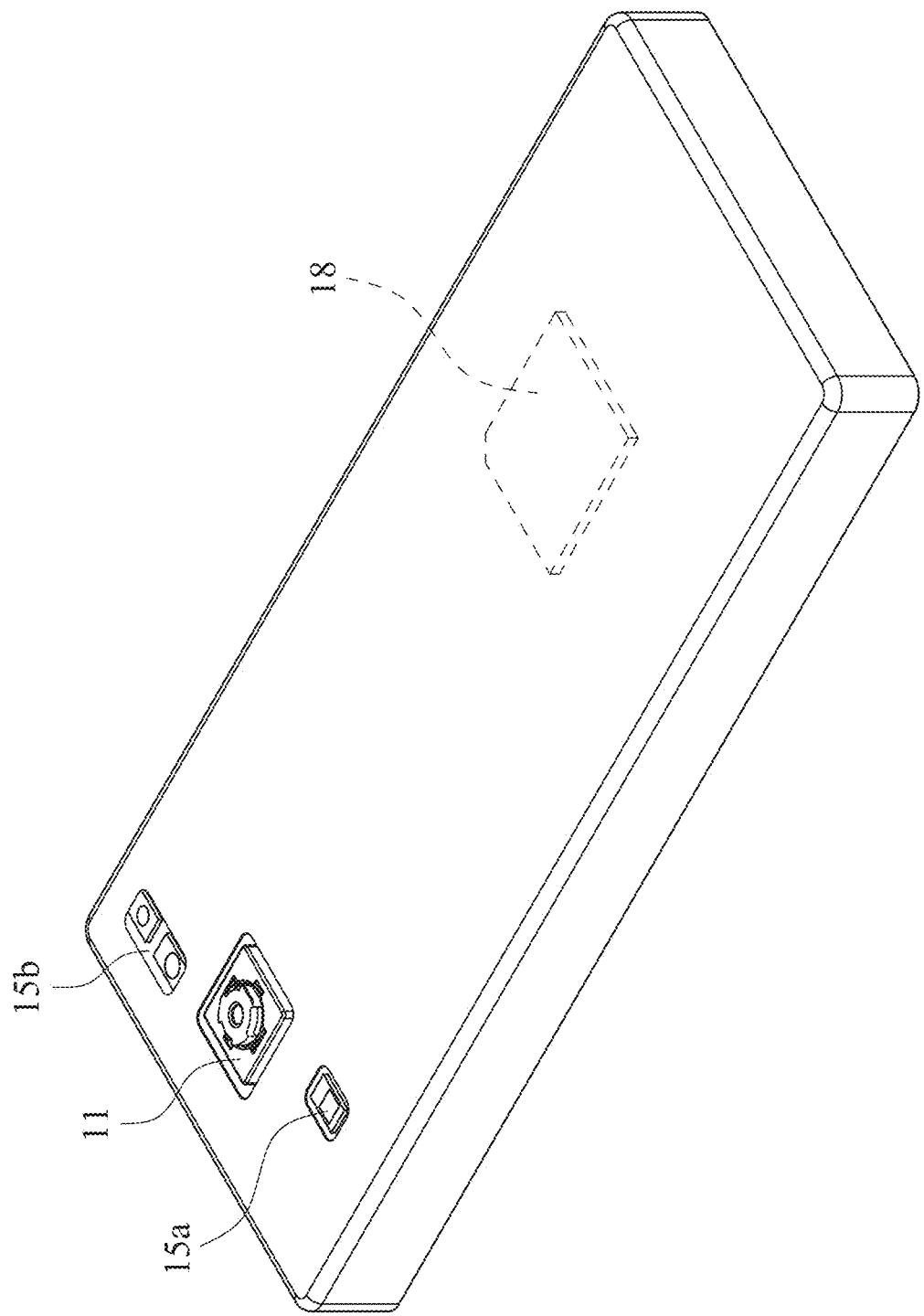
FIG. 13B is another schematic view of the electronic device of FIG. 13A.
Figure 13C:
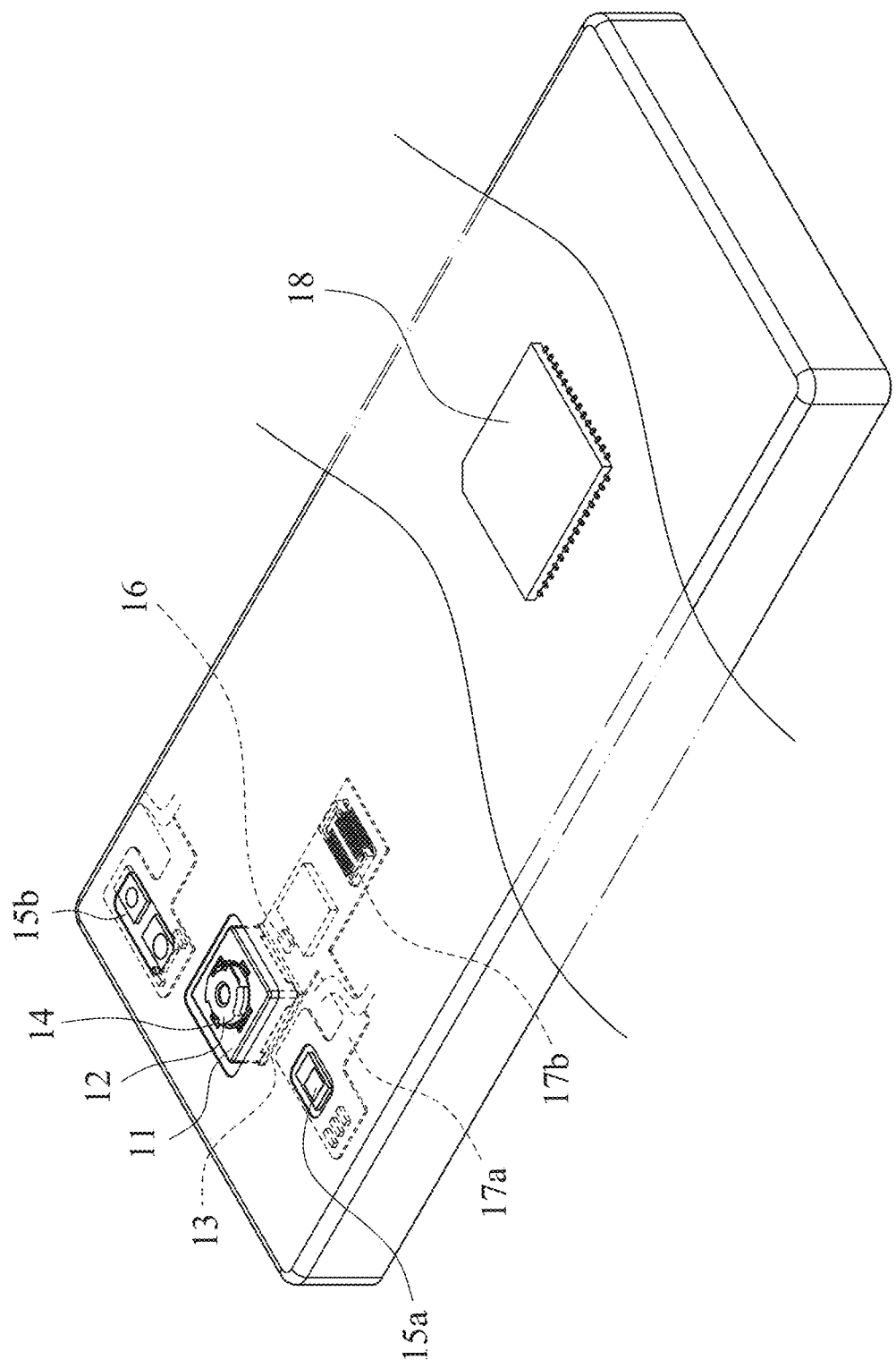
FIG. 13C is a schematic view of elements of the electronic device of FIG. 13A.
Figure 13D:
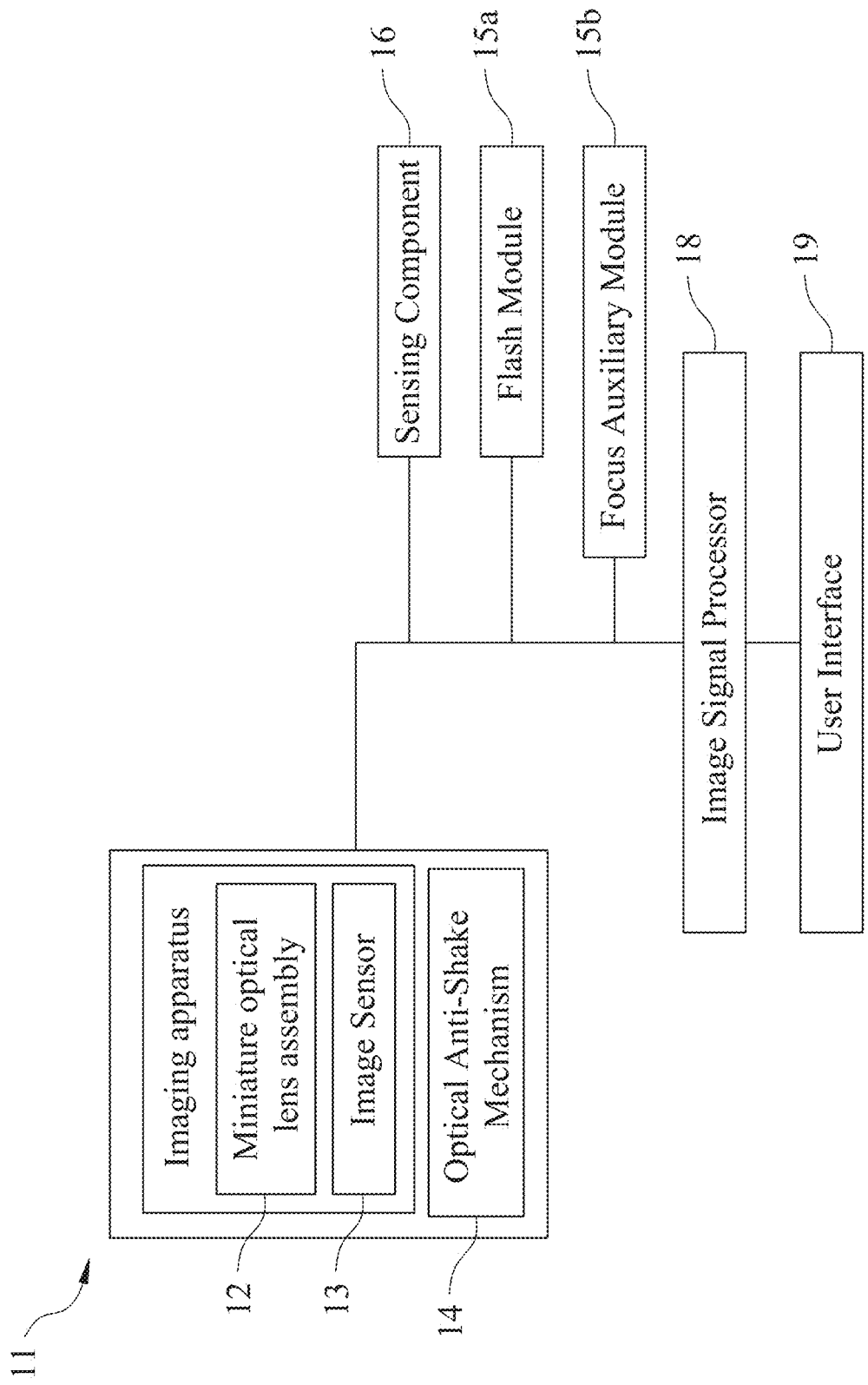
FIG. 13D is a block diagram of the electronic device of FIG. 13A.

FIG. 13A is a schematic view of an electronic device 10 according to the 32nd embodiment of the present disclosure. FIG. 13B is another schematic view of the electronic device 10 of FIG. 13A. FIG. 13C is a schematic view of elements of the electronic device 10 of FIG. 13A. FIG. 13D is a block diagram of the electronic device 10 of FIG. 13A. As shown in FIG. 13A, FIG. 13B, FIG. 13C and FIG. 13D, the electronic device 10 of the 32nd embodiment is a smartphone, the electronic device 10 includes the imaging apparatus 11, wherein the imaging apparatus 11 includes a miniature optical lens assembly 12 of the present disclosure and an image sensor 13. The image sensor 13 is disposed on an image surface (not shown) of the miniature optical lens assembly 12. Therefore, marketing demands for mass production and outward appearance of the electronic devices can be achieved.

Furthermore, the user can activate the capturing mode by a user interface 19 of the electronic device 10, wherein the user interface 19 of the 32nd embodiment can be a touch screen 19a, a button 19b, etc. At this moment, the miniature optical lens assembly 12 collects imaging light on the image sensor 13 and outputs electronic signals associated with images to an image signal processor (ISP) 18.

Furthermore, in response to the camera specification of the electronic device 10, the electronic device 10 can further include an optical anti-shake mechanism 14, which can be an optical image stabilization (OIS) device. Moreover, the electronic device 10 can further include at least one auxiliary optical component (reference number is omitted) and at least one sensing component 16. The auxiliary optical component can be a flash module 15a and a focus auxiliary module 15b, the flash module 15a is for compensating the color temperature, and the focus auxiliary module 15b can be an infrared distance measurement component, a laser focus module, etc. The sensing component 16 can have functions for sensing physical momentum and kinetic energies, such as an accelerator, a gyroscope, and a hall effect element, so as to sense shaking or jitters applied by hands of the user or external environments. Thus the autofocus function and the optical anti-shake mechanism 14 disposed on the electronic device 10 can function to obtain great image quality and facilitate the imaging apparatus 11 of the electronic device 10 according to the present disclosure to have a capturing function with multiple modes, such as taking optimized selfies, high dynamic range (HDR) with a low light source, 4K resolution recording, etc. Furthermore, the user can visually see the captured image of the camera through the touch screen 19a and manually operate the view finding range on the touch screen 19a to achieve the auto focus function of what you see is what you get.

Furthermore, as shown in FIG. 13C, the imaging apparatus 11, the optical anti-shake mechanism 14, the sensing component 16, the flash module 15a and the focus auxiliary module 15b can be disposed on a flexible printed circuit board (FPC) 17a and electrically connected with the associated elements, such as an image signal processor 18, via a connector 17b so as to perform a capturing process. Because the current electronic devices, such as smartphone, have a tendency of being light and thin, the way of disposing imaging apparatus and related elements on the flexible printed circuit board and then integrating the circuit into the main board of the electronic device via the connector can satisfy the mechanical design of the limited space inside the electronic device and the layout requirements, and obtain more margins. The autofocus function of the imaging apparatus can be controlled more flexibly via the touch screen of the electronic device. In other embodiments (not shown), the sensing components and the auxiliary optical components can also be disposed on the main board of the electronic device or carrier boards in other forms according to requirements of the mechanical design and the circuit layout.

Moreover, the electronic device 10 can further include, but not be limited to, a display, a control unit, a storage unit, a random-access memory (RAM), a read-only memory (ROM), or the combination thereof.

33rd Embodiment

Figure 14:
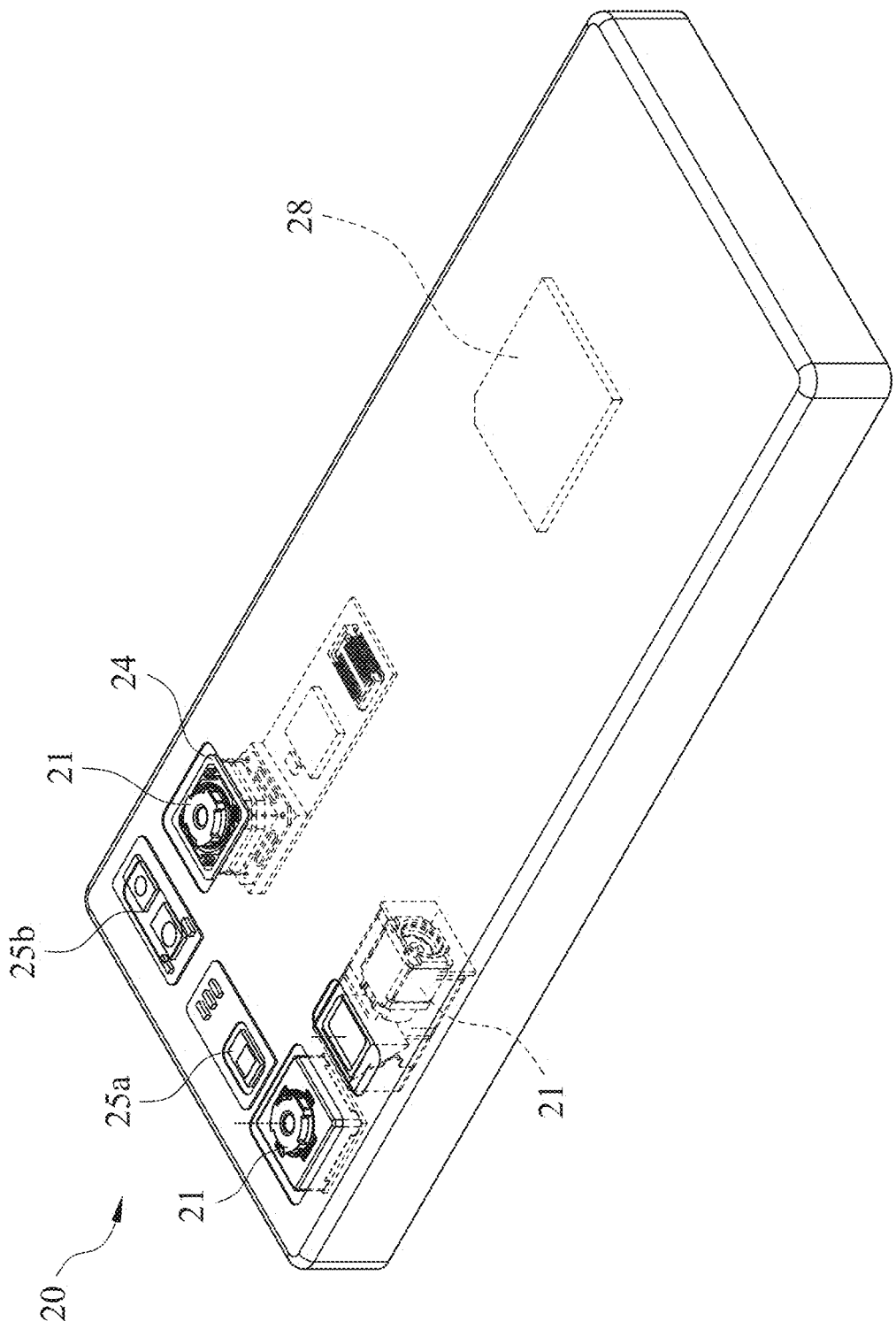
FIG. 14 is a schematic view of an electronic device according to the 33rd embodiment of the present disclosure.

FIG. 14 is a schematic view of an electronic device 20 according to the 33rd embodiment of the present disclosure. As shown in FIG. 14, the electronic device 20 is a smartphone, the electronic device 20 includes three imaging apparatus 21, wherein the imaging apparatus 21 includes a miniature optical lens assembly of the present disclosure (not shown) and an image sensor (not shown).

Furthermore, when the user captures images of an imaged object via a user interface (not shown) of the electronic device 20. At this moment, the miniature optical lens assembly collects imaging light on the image sensor and outputs electronic signals associated with images to an image signal processor 28. Moreover, in response to the camera specification of the electronic device 20, the electronic device 20 can further include an optical anti-shake mechanism 24, a flash module 25a and a focus auxiliary module 25b. Therefore, it is favorable for obtaining a better image quality.

34th Embodiment

Figure 15:
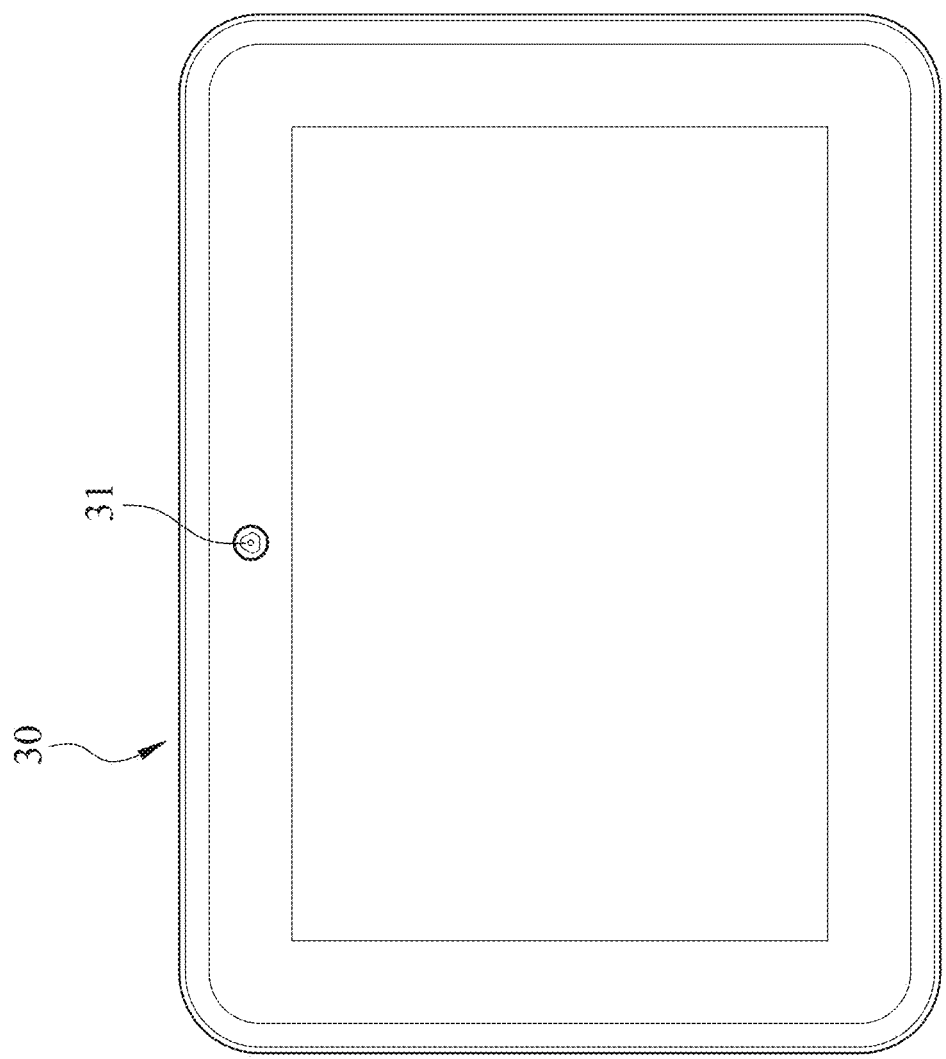
FIG. 15 is a schematic view of an electronic device according to the 34th embodiment of the present disclosure.

FIG. 15 is a schematic view of an electronic device 30 according to the 34th embodiment of the present disclosure. The electronic device 30 of the 34th embodiment is a tablet, and the electronic device 30 includes an imaging apparatus 34 according to the present disclosure.

35th Embodiment

Figure 16:
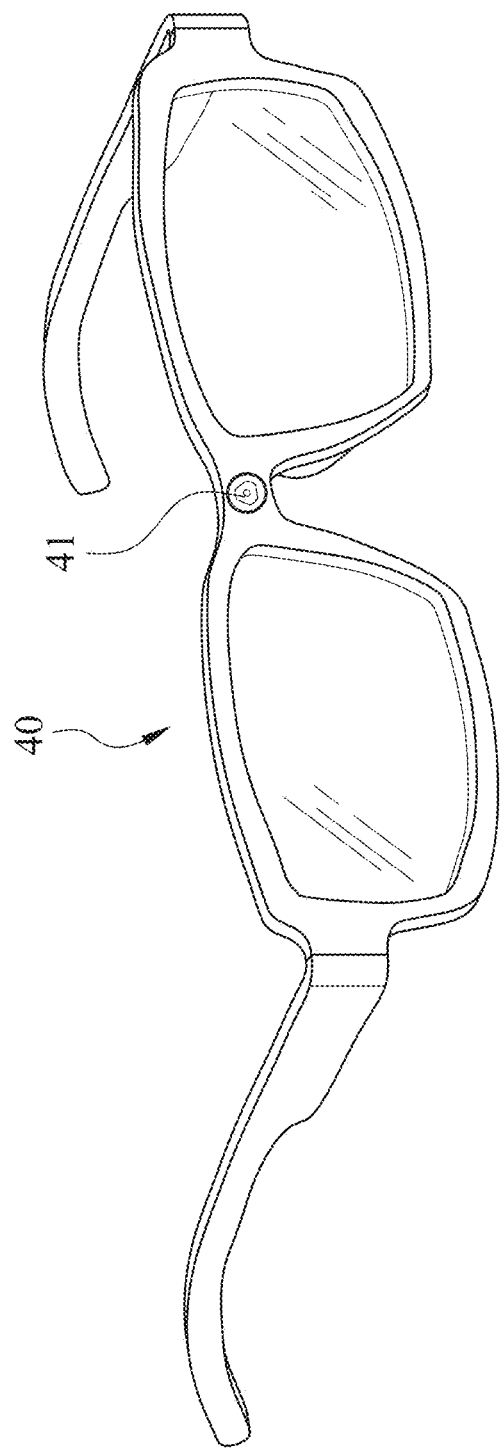
FIG. 16 is a schematic view of an electronic device according to the 35th embodiment of the present disclosure.

FIG. 16 is a schematic view of an electronic device 40 according to the 35th embodiment of the present disclosure. The electronic device 40 of the 35th embodiment is a wearable device, and the electronic device 40 includes an imaging apparatus 41 according to the present disclosure.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A miniature optical lens assembly, which has at least one of optical element, comprising:
    the optical element, comprising:
        a low reflection layer disposed on at least one surface of the optical element, wherein the low reflection layer comprises:
            a plurality of nanocrystalline grains located on one surface of the low reflection layer;
    wherein the optical element is at least one of a light blocking element, an annular spacer element and a barrel element;
    wherein an average diameter of the nanocrystalline grains is DC, a reflectance in a wavelength range of 380 nm-780 nm of the low reflection layer is R3878, and the following conditions are satisfied:

$5 \text{ nm} \leq DC \leq 200 \text{ nm}$; and $R3878 \leq 0.50\%$.

2. The miniature optical lens assembly of claim 1, wherein the average diameter of the nanocrystalline grains is DC, and the following condition is satisfied:

$10 \text{ nm} \leq DC \leq 150 \text{ nm}$.

3. The miniature optical lens assembly of claim 2, wherein the average diameter of the nanocrystalline grains is DC, and the following condition is satisfied:

$39 \text{ nm} \leq DC \leq 88 \text{ nm}$.

4. The miniature optical lens assembly of claim 2, wherein a reflectance in a wavelength range of 380 nm-500 nm of the low reflection layer is R3850, and the following condition is satisfied:

$R3850 \leq 0.40\%$.

5. The miniature optical lens assembly of claim 2, wherein a reflectance in a wavelength range of 400 nm-700 nm of the low reflection layer is R4070, and the following condition is satisfied:

$R4070 \leq 0.50\%$.

6. The miniature optical lens assembly of claim 2, wherein a reflectance in a wavelength range of 400 nm-550 nm of the low reflection layer is R4055, and the following condition is satisfied:

$R4055 \leq 0.40\%$.

7. The miniature optical lens assembly of claim 2, wherein a reflectance in a wavelength range of 450 nm-650 nm of the low reflection layer is R4565, and the following condition is satisfied:

$R4565 \leq 0.40\%$.

8. The miniature optical lens assembly of claim 2, wherein a reflectance in a wavelength range of 500 nm-580 nm of the low reflection layer is R5058, and the following condition is satisfied:

$R5058 \leq 0.50\%$.

9. The miniature optical lens assembly of claim 2, wherein a reflectance in a wavelength range of 550 nm-700 nm of the low reflection layer is R5570, and the following condition is satisfied:

$R5570 \leq 0.30\%$.

10. The miniature optical lens assembly of claim 2, wherein a reflectance in a wavelength range of 580 nm-780 nm of the low reflection layer is R5878, and the following condition is satisfied:

$$R5878 \leq 0.80\%.$$

11. The miniature optical lens assembly of claim 2, wherein the nanocrystalline grains are made of oxide material.

12. The miniature optical lens assembly of claim 11, wherein the nanocrystalline grains are made of silicon dioxide ($SiO_2$).

13. The miniature optical lens assembly of claim 11, wherein the nanocrystalline grains are made of aluminium oxide ($Al_2O_3$).

14. The miniature optical lens assembly of claim 11, wherein the nanocrystalline grains are made of titanium dioxide ($TiO_2$).

15. The miniature optical lens assembly of claim 2, wherein the nanocrystalline grains are made of metal nitride material.

16. The miniature optical lens assembly of claim 1, wherein the reflectance in the wavelength range of 380 nm-780 nm of the low reflection layer is R3878, and the following condition is satisfied:

$$R3878 \leq 0.30\%.$$

17. The miniature optical lens assembly of claim 16, wherein the reflectance in the wavelength range of 380 nm-780 nm of the low reflection layer is R3878, and the following condition is satisfied:

$$R3878 \leq 0.15\%.$$

18. An imaging apparatus, comprising:
the miniature optical lens assembly of claim 1; and
an image sensor disposed on an image surface of the miniature optical lens assembly.

19. An electronic device, comprising:
the imaging apparatus of claim 18.

* * * * *